United States Patent
Clark et al.

(10) Patent No.: US 10,003,590 B2
(45) Date of Patent: Jun. 19, 2018

(54) METHODS AND SYSTEMS FOR LINKING UNTRUSTED APPLICATIONS TO SERVER SYSTEMS

(71) Applicant: Facebook, Inc., Menlo Park, CA (US)

(72) Inventors: Jason Duane Clark, Woodinville, WA (US); Eugene Zarakhovsky, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 88 days.

(21) Appl. No.: 14/728,841

(22) Filed: Jun. 2, 2015

(65) Prior Publication Data

US 2016/0359826 A1    Dec. 8, 2016

(51) Int. Cl.
| | |
|---|---|
| H04L 29/06 | (2006.01) |
| H04L 29/08 | (2006.01) |
| H04W 4/20 | (2018.01) |
| G06Q 50/00 | (2012.01) |

(52) U.S. Cl.
CPC ...... *H04L 63/0807* (2013.01); *H04L 63/0815* (2013.01); *H04L 63/10* (2013.01); *H04L 63/107* (2013.01); *H04L 63/108* (2013.01); *H04L 67/10* (2013.01); *H04W 4/206* (2013.01); *H04W 4/21* (2018.02); *G06Q 50/01* (2013.01)

(58) Field of Classification Search
CPC . H04L 63/08; H04L 63/0807; H04L 63/0815; H04L 63/10; H04L 63/107; H04L 63/108; G06Q 50/01
See application file for complete search history.

(56) References Cited

U.S. PATENT DOCUMENTS

| | | | | |
|---|---|---|---|---|
| 7,373,499 | B2 * | 5/2008 | MacKenzie | H04L 9/002 713/150 |
| 8,474,017 | B2 * | 6/2013 | Schultz | G06F 21/41 726/4 |
| 8,505,084 | B2 * | 8/2013 | Shukla | G06F 21/6218 709/219 |
| 8,935,757 | B2 * | 1/2015 | Srinivasan | H04L 63/10 726/4 |
| 9,419,962 | B2 * | 8/2016 | Biswas | G06F 9/00 |
| 2013/0326368 | A1 * | 12/2013 | Voas | G06Q 50/01 715/753 |

* cited by examiner

*Primary Examiner* — Zachary A. Davis
(74) *Attorney, Agent, or Firm* — Morgan, Lewis & Bockius LLP

(57) ABSTRACT

An electronic device with a display detects an input in a user interface for a second application not associated with a server system. In response to detecting the first input, the device sends a first request from the second application to a first application associated with the server system. In response to the first request, the device sends a first command from the first application to the server system on behalf of the second application. The first command is a command for performance of a first operation at the server system. The first operation corresponds to the input detected by the device. The device receives a voucher, or an indication that a voucher has been created, at the second application pre-authorizing performance of a predefined second operation at the server system upon receipt, by the server system, of a second command from the second application.

20 Claims, 19 Drawing Sheets ated with the server (an "untrusted process") on an electronic device, the untrusted process thus communicates with a trusted process on the device, which in turn sends a command for the operation to the server. The command can then be authenticated by the server because it originated from the trusted process (e.g., operating in a user logged-in state). As such, a trusted process is invoked every time a user initiates a request of the server from an untrusted process on an electronic device. This is an inefficient work-flow because it increases the total number of processes running on an electronic device. This procedure also detracts from the overall user experience by slowing down operation of the electronic device, requiring additional user inputs to confirm a request or log-in to a server system, and visually disrupting the user.

METHODS AND SYSTEMS FOR LINKING UNTRUSTED APPLICATIONS TO SERVER SYSTEMS

TECHNICAL FIELD

This relates generally to linking untrusted applications to server systems, including but not limited to pre-authorizing operations at a multi-user server system upon receipt of a command from an application that is not associated with the server system.

BACKGROUND

Social networks provide a convenient way for a large number of people to interact with each other. These networks are conventionally hosted on secured server systems that safeguard each user's private information and shared content. To achieve this security, however, the server authenticates each user command to perform an operation at the server system as originating from an authorized user. One way to accomplish this is to send each command through a process associated with the server (a "trusted process"), and to ask the user to approve each command. For example, users are asked to authenticate themselves at the trusted process (e.g., by logging in to an application or website associated with the server) when sending each command.

When the user initiates an action from a process not associated with the server (an "untrusted process") on an electronic device, the untrusted process thus communicates with a trusted process on the device, which in turn sends a command for the operation to the server. The command can then be authenticated by the server because it originated from the trusted process (e.g., operating in a user logged-in state). As such, a trusted process is invoked every time a user initiates a request of the server from an untrusted process on an electronic device. This is an inefficient work-flow because it increases the total number of processes running on an electronic device. This procedure also detracts from the overall user experience by slowing down operation of the electronic device, requiring additional user inputs to confirm a request or log-in to a server system, and visually disrupting the user.

For example, in certain operating environments that do not generally allow two applications to be running at the same time (e.g., iOS) this workflow causes the electronic device to rapidly shift between applications, and thus between user interfaces (e.g., from a UI for the untrusted process to a UI for the trusted process), every time the user initiates an action from the untrusted process. Avoiding this rapid shift in user interfaces would provide an improved user experience. In addition, these methods take longer than necessary, thereby wasting energy. This latter consideration is particularly important in battery-operated devices.

SUMMARY

Accordingly, there is a need for methods and systems with faster, more efficient methods and interfaces for linking untrusted applications to server systems. Such methods and interfaces optionally complement or replace conventional methods for linking untrusted applications to server systems.

Such methods and interfaces reduce the cognitive burden on a user and produce a more efficient human-machine interface. For battery-operated devices, such methods and interfaces conserve power and increase the time between battery charges.

The above deficiencies and other problems associated with performing operations on a server system are reduced or eliminated by the disclosed methods and devices. In some embodiments, the disclosed methods and devices allow performance of a user operation at the server system when initiated by a command received directly from an untrusted process, under certain conditions triggered by the user's previous actions. In some embodiments, this is achieved by issuing a voucher that pre-authorizes performance of one or more predefined, subsequent operations at the server system in response to a command initiated from an untrusted process. The voucher authorizes an untrusted process to send the subsequent command directly to the server system (without invoking a trusted process), which authenticates the command by virtue of the previously issued voucher. This solution bypasses sending the command through a trusted process, reducing the cognitive burden on a user and producing a more efficient human-machine interface. For battery-operated devices, such methods and interfaces conserve power and increase the time between battery charges.

In accordance with some embodiments, a method is performed at a client device with a display, one or more processors, and memory. The memory stores one or more programs for execution by the one or more processors, including a first application associated with a server system and a second application not associated with the server system. The method includes: detecting a first user input in a user interface for the second application, and in response to detecting the first user input, sending a first request from the second application to the first application. The method also includes, in response to the first request, sending a first command from the first application to the server system on behalf of the second application, for performance of a first operation at the server system, the first operation corresponding to the first user input. The method further includes receiving a voucher at the second application pre-authorizing performance of a predefined second operation at the server system upon receipt, by the server system, of a second command from the second application.

In accordance with some embodiments, a client device includes a display, one or more processors, memory, and one or more programs; the one or more programs are stored in the memory and configured to be executed by the one or more processors. The one or more programs include instructions for performing the operations of the client-side method described above. In accordance with some embodiments, a non-transitory computer-readable storage medium has stored therein instructions that, when executed by the client device, cause the client device to perform the operations of the client-side method described above. In accordance with some embodiments, a client device includes a display and means for performing the operations of the client-side method described above. In accordance with some embodiments, a non-transitory computer-readable storage medium has stored therein instructions that, when executed by the client device, cause the client device to perform the operations of the portion of the above client-side method performed by the first application.

Thus, client devices are provided with faster, more efficient methods for linking untrusted applications to server systems, thereby increasing the effectiveness, efficiency, and user satisfaction with such devices.

In accordance with some embodiments, a method is performed at a server system (e.g., a social-network system) with one or more processors and memory. The memory stores instructions for execution by the one or more processors. The method includes: receiving, from a first application stored on an electronic device of a user and associated with the server system, a first command for performance of a first operation at the server system, the first command sent on behalf of a second application stored on the electronic device of the user and not associated with the server system. The method also includes, in response to receiving the first command, performing the first operation. The method also includes, after receiving the first command, receiving, from the second application, a second command for performance of a second operation. The second command may be accompanied by a voucher that authorizes performance of the second operation. The method further includes, in response to receiving the second command: upon a determination that the second operation is pre-authorized for performance at the server without verification of the user's identification, performing the second operation, and upon a determination that the second operation is not pre-authorized for performance at the server without verification of the user's identification, forgoing performing the second operation.

In accordance with some embodiments, a server system (e.g., a social-network system) includes one or more processors, memory, and one or more programs; the one or more programs are stored in the memory and configured to be executed by the one or more processors. The one or more programs include instructions for performing the operations of the server-side method described above. In accordance with some embodiments, a non-transitory computer-readable storage medium has stored therein instructions that, when executed by the server system, cause the social-network system to perform the operations of the server-side method described above. In accordance with some embodiments, a server system (e.g., a social-network system) includes means for performing the operations of the server-side method described above.

Thus, server systems (e.g., social-network systems) are provided with faster, more efficient methods for linking to untrusted applications, thereby increasing the effectiveness and efficiency of such systems and user satisfaction with such systems.

BRIEF DESCRIPTION OF THE DRAWINGS

For a better understanding of the various described embodiments, reference should be made to the Description of Embodiments below, in conjunction with the following drawings. Like reference numerals refer to corresponding parts throughout the figures and description.

DESCRIPTION OF THE INVENTION

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first application could be termed a second application, and, similarly, a second application could be termed a first application, without departing from the scope of the various described embodiments. The first application and the second application are both applications, but they are not the same application.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
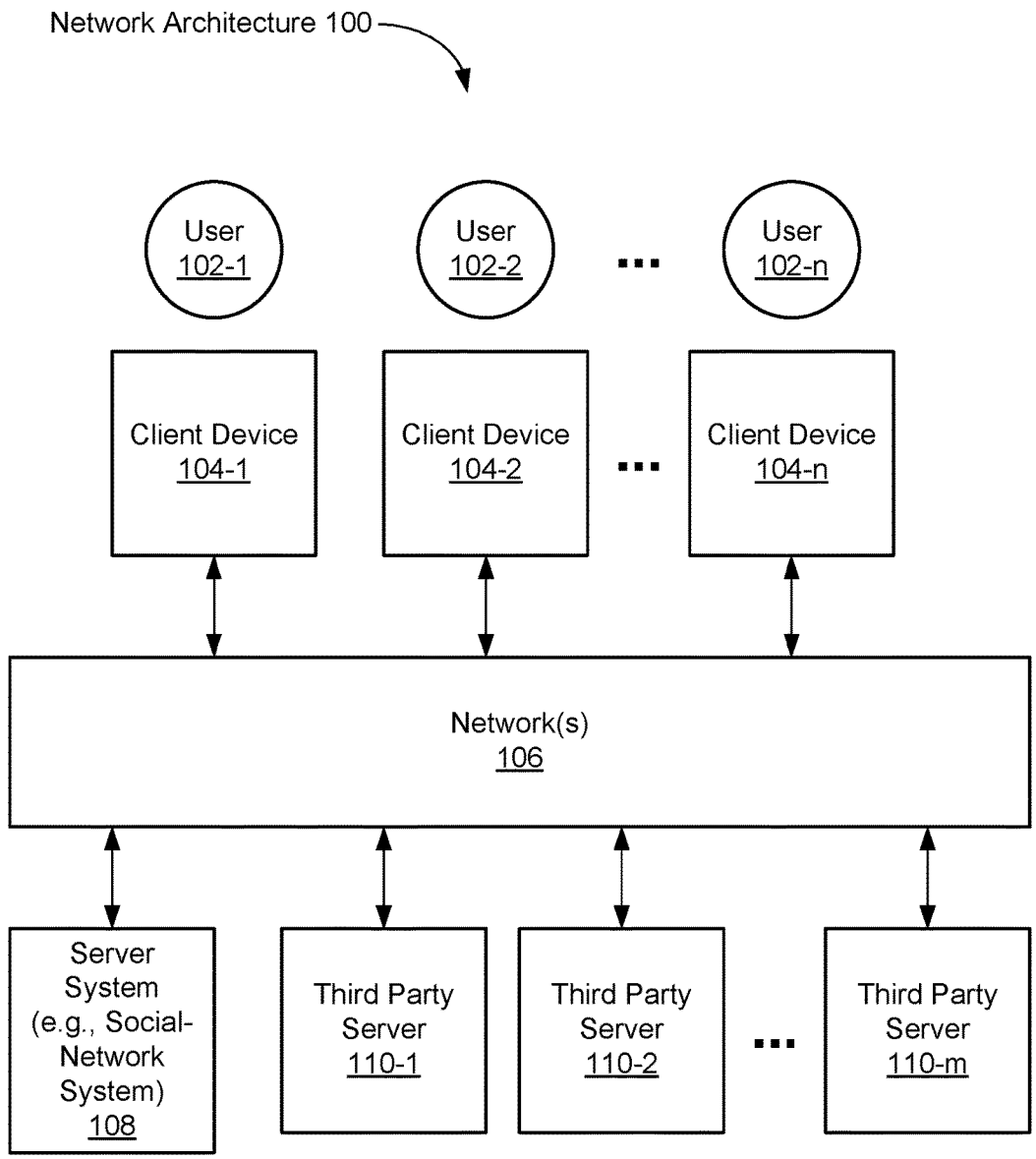
FIG. 1 is a block diagram illustrating an exemplary network architecture of a social network in accordance with some embodiments.

FIG. 1 is a block diagram illustrating an exemplary network architecture 100 of a social network in accordance with some embodiments. The network architecture 100 includes a number of client devices (also called "client systems," "client computers," or "clients") 104-1, 104-2, . . . 104-n communicably connected to an electronic social-network system 108 by one or more networks 106 (e.g., the Internet, cellular telephone networks, mobile data networks, other wide area networks, local area networks, metropolitan area networks, and so on). In some embodiments, the one or more networks 106 include a public communication network (e.g., the Internet and/or a cellular data network), a private communications network (e.g., a private LAN or leased lines), or a combination of such communication networks.

In some embodiments, the client devices 104-1, 104-2, . . . 104-n are computing devices such as smart watches, personal digital assistants, portable media players, smart phones, tablet computers, 2D gaming devices, 3D (e.g., virtual reality) gaming devices, laptop computers, desktop computers, televisions with one or more processors embedded therein or coupled thereto, in-vehicle information systems (e.g., an in-car computer system that provides navigation, entertainment, and/or other information), and/or other appropriate computing devices that can be used to communicate with the social-network system 108. In some embodiments, the social-network system 108 is a single computing device such as a computer server, while in other embodiments, the social-network system 108 is implemented by multiple computing devices working together to perform the actions of a server system (e.g., cloud computing).

Users 102-1, 102-2, . . . 102-n employ the client devices 104-1, 104-2, . . . 104-n to access the social-network system 108 and to participate in a corresponding social-networking service provided by the social-network system 108. For example, one or more of the client devices 104-1, 104-2, . . . 104-n execute web browser applications that can be used to access the social-networking service. As another example, one or more of the client devices 104-1, 104-2, . . . 104-n execute software applications that are specific to the social-networking service (e.g., social-networking "apps" running on smart phones or tablets, such as a Facebook social-networking application running on an iPhone, Android, or Windows smart phone or tablet).

Users interacting with the client devices 104-1, 104-2, . . . 104-n can participate in the social-networking service provided by the social-network system 108 by posting information, such as text comments (e.g., updates, announcements, replies), digital photos, videos, audio files, links, and/or other electronic content. Users of the social-networking service can also annotate information posted by other users of the social-networking service (e.g., endorsing or "liking" a posting of another user, or commenting on a posting by another user). In some embodiments, information can be posted on a user's behalf by systems and/or services external to the social-network system 108. For example, the user may post a review of a movie to a movie-review website, and with proper permissions that website may cross-post the review to the social network system 108 on the user's behalf. In another example, a software application executing on a mobile client device, with proper permissions, may use global positioning system (GPS) or other geo-location capabilities (e.g., Wi-Fi or hybrid positioning systems) to determine the user's location and update the social network system 108 with the user's location (e.g., "At Home", "At Work", or "In San Francisco, Calif."), and/or update the social network system 108 with information derived from and/or based on the user's location. Users interacting with the client devices 104-1, 104-2, . . . 104-n can also use the social-networking service provided by the social-network system 108 to define groups of users. Users interacting with the client devices 104-1, 104-2, . . . 104-n can also use the social-networking service provided by the social-network system 108 to communicate and collaborate with each other.

In some embodiments, the network architecture 100 also includes third-party servers 110-1, 110-2, . . . 110-m. In some embodiments, a given third-party server 110 is used to host third-party websites that provide web pages to client devices 104, either directly or in conjunction with the social-network system 108. In some embodiments, the social-network system 108 uses inline frames ("iframes") to nest independent websites within a user's social network session. In some embodiments, a given third-party server is used to host third-party applications that are used by client devices 104, either directly or in conjunction with the social-network system 108. In some embodiments, the social-network system 108 uses iframes to enable third-party developers to create applications that are hosted separately by a third-party server 110, but operate within a social-networking session of a user 102 and are accessed through the user's profile in the social-network system 108. Exemplary third-party applications include applications for books, business, communication, contests, education, entertainment, fashion, finance, food and drink, games, health and fitness, lifestyle, local information, movies, television, music and audio, news, photos, video, productivity, reference material, security, shopping, sports, travel, utilities, and the like. In some embodiments, a given third-party server 110 is used to host enterprise systems, which are used by client devices 104, either directly or in conjunction with the social-network system 108. In some embodiments, a given third-party server 110 is used to provide third-party content (e.g., news articles, reviews, message feeds, etc.).

In some embodiments, a given third-party server 110 is a single computing device, while in other embodiments, a given third-party server 110 is implemented by multiple computing devices working together to perform the actions of a server system (e.g., cloud computing).

Figure 2:
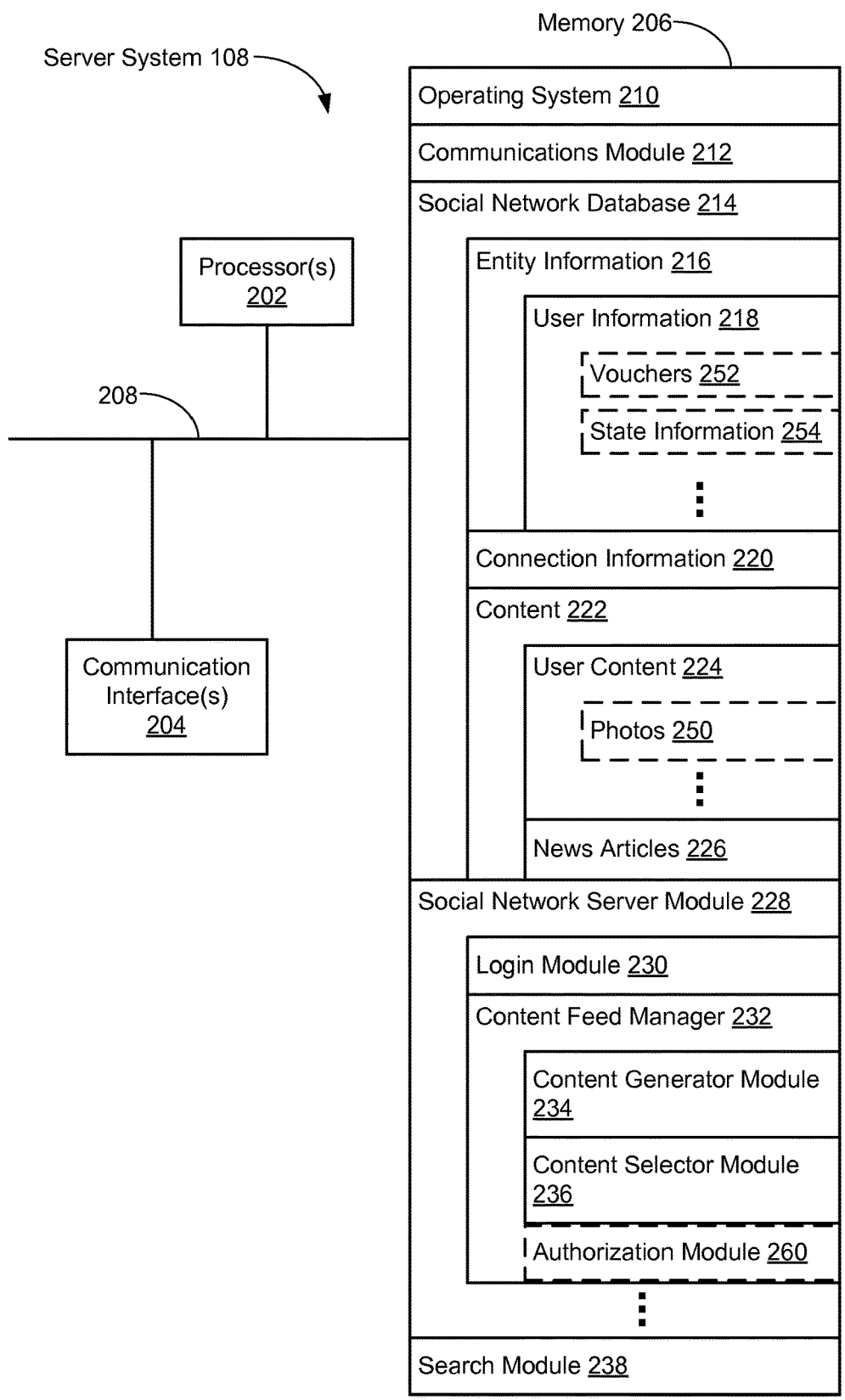
FIG. 2 is a block diagram illustrating an exemplary social-network system in accordance with some embodiments.

FIG. 2 is a block diagram illustrating an exemplary server system 108 (e.g., a social-network system) in accordance with some embodiments. The social-network system 108 typically includes one or more processing units (processors or cores) 202, one or more network or other communications interfaces 204, memory 206, and one or more communication buses 208 for interconnecting these components. The communication buses 208 optionally include circuitry (sometimes called a chipset) that interconnects and controls communications between system components. The server system 108 (e.g., a social-network system) optionally includes a user interface (not shown). The user interface, if provided, may include a display device and optionally includes inputs such as a keyboard, mouse, trackpad, and/or input buttons. Alternatively or in addition, the display device includes a touch-sensitive surface, in which case the display is a touch-sensitive display.

Memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, and/or other non-volatile solid-state storage devices. Memory 206 may optionally include one or more storage devices remotely located from the processor(s) 202. Memory 206, or alternately the non-volatile memory device(s) within memory 206, includes a non-transitory computer-readable storage medium. In some embodiments, memory 206 or the computer-readable storage medium of memory 206 stores the following programs, modules and data structures, or a subset or superset thereof:
- an operating system 210 that includes procedures for handling various basic system services and for performing hardware dependent tasks;
- a network communication module 212 that is used for connecting the server system 108 (e.g., a social-network system) to other computers via the one or more communication network interfaces 204 (wired or wireless) and one or more communication networks (e.g., the one or more networks 106);
- a social network database 214 for storing data associated with the social network, such as:
  - entity information 216, such as user information 218, which optionally includes (1) vouchers 252 pre-authorizing performance of operations at the server system 108 (e.g., a social-network system) upon receipt of commands from untrusted processes (e.g., an application running on a client device 104 or on a third-party server 110 that is not associated with the server system 108), and (2) state information 254 regarding client devices 104;
  - connection information 220; and
  - content 222, such as user content 224 (e.g., optional user photos 250) and/or news articles 226;
- a social network server module 228 for providing social-networking services and related features (e.g., in conjunction with browser module 338 or social network client module 340 on the client device 104, FIG. 3), which includes:
  - a login module 230 for logging a user 102 at a client device 104 into the social-network system 108;
  - a content feed manager 232 for providing content to be sent to clients 104 for display, which includes:
    - a content generator module 234 for adding objects to the social network database 214, such as images (e.g., photos), videos, audio files, comments, status messages, links, applications, and/or other entity information 216, connection information 220, or content 222;
    - a content selector module 236 for choosing the information/content to be sent to clients 104 for display; and
    - optionally, an authorization module 260 for evaluating requests, sent from untrusted processes, to perform operations at the server system 108 (e.g., a social-network system); and
  - a search module 238 for enabling users of the social-network system to search for content and other users in the social network.

The social network database 214 stores data associated with the social network in one or more types of databases, such as graph, dimensional, flat, hierarchical, network, object-oriented, relational, and/or Extensible Markup Language (XML) databases.

In some embodiments, the social network database 214 includes a graph database, with entity information 216 represented as nodes in the graph database and connection information 220 represented as edges in the graph database. The graph database includes a plurality of nodes, as well as a plurality of edges that define connections between corresponding nodes. In some embodiments, the nodes and/or edges themselves are data objects that include the identifiers, attributes, and information for their corresponding entities, some of which are rendered at clients 104 on corresponding profile pages or other pages in the social-networking service. In some embodiments, the nodes also include pointers or references to other objects, data structures, or resources for use in rendering content in conjunction with the rendering of the pages corresponding to the respective nodes at clients 104.

Entity information 216 includes user information 218, such as user profiles, login information, privacy and other preferences, biographical data, and the like. In some embodiments, for a given user, the user information 218 includes the user's name, profile picture, contact information, birth date, sex, marital status, family status, employment, education background, preferences, interests, and/or other demographic information.

In some embodiments, for a given user, the user information 218 includes vouchers 252 (e.g., tokens) pre-authorizing performance of one or more operations at the server system 108 (e.g., a social-network system), upon receiving a command from an untrusted process running on a client device 104, or a third-party server 110, associated with the user. In some embodiments, a voucher 252 is generated by the server system 108 in response to a prior command received from a trusted process (e.g., an application associated with the server system 108 running on a client device 104 or a third-party server 110). In some embodiments, a voucher is generated by a trusted, external process (e.g., an application associated with the server system 108 running on a client device 104 or a third-party server 110) in response to a request sent from an untrusted process (e.g., an application not associated with the server system 108 running on a client device 104 or a third-party server 110). The server system 108 may consider a process running on a client device 104 to be trusted based on, for example, a user logging into the server system 108 through the process or an exchange of information when installing the corresponding application on the client device 104.

In some embodiments, entity information 216 includes information about a physical location (e.g., a restaurant, theater, landmark, city, state, or country), real or intellectual property (e.g., a sculpture, painting, movie, game, song, idea/concept, photograph, or written work), a business, a group of people, and/or a group of businesses. In some embodiments, entity information 216 includes information about a resource, such as an audio file, a video file, a digital photo, a text file, a structured document (e.g., web page), or an application. In some embodiments, the resource is located in the social-network system 108 (e.g., in content 222) or on an external server, such as third-party server 110.

In some embodiments, connection information 220 includes information about the relationships between entities in the social network database 214. In some embodiments, connection information 220 includes information about edges that connect pairs of nodes in a graph database. In some embodiments, an edge connecting a pair of nodes represents a relationship between the pair of nodes.

In some embodiments, an edge includes or represents one or more data objects or attributes that correspond to the relationship between a pair of nodes. For example, when a first user indicates that a second user is a "friend" of the first user, the social-network system 108 transmits a "friend request" to the second user. If the second user confirms the "friend request," the social-network system 108 creates and stores an edge connecting the first user's user node and the second user's user node in a graph database as connection information 220 that indicates that the first user and the second user are friends. In some embodiments, connection information 220 represents a friendship, a family relationship, a business or employment relationship, a fan relationship, a follower relationship, a visitor relationship, a subscriber relationship, a superior/subordinate relationship, a reciprocal relationship, a non-reciprocal relationship, another suitable type of relationship, or two or more such relationships.

In some embodiments, an edge between a user node and another entity node represents connection information about a particular action or activity performed by a user of the user node towards the other entity node. For example, a user may "like" or have "attended," "played," "listened," "cooked," "worked at," or "watched" the entity at the other node. The page in the social-networking service that corresponds to the entity at the other node may include, for example, a selectable "like," "check in," or "add to favorites" icon. After the user clicks one of these icons, the social-network system 108 may create a "like" edge, "check in" edge, or a "favorites" edge in response to the corresponding user action. As another example, the user may listen to a particular song using a particular application (e.g., an online music application). In this case, the social-network system 108 may create a "listened" edge and a "used" edge between the user node that corresponds to the user and the entity nodes that correspond to the song and the application, respectively, to indicate that the user listened to the song and used the application. In addition, the social-network system 108 may create a "played" edge between the entity nodes that correspond to the song and the application to indicate that the particular song was played by the particular application.

In some embodiments, content 222 includes text (e.g., American Standard Code for Information Interchange (ASCII), Standard Generalized Markup Language (SGML), and Hypertext Markup Language (HTML)), images (e.g., jpeg, tif, and gif), graphics (e.g., vector-based or bitmap), audio, video (e.g., mpeg), other multimedia, and/or combinations thereof. In some embodiments, content 222 includes executable code (e.g., games executable within a browser window or frame), podcasts, links, and the like.

In some embodiments, the social network server module 228 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), HTML, Extensible Markup Language (XML), Java, JavaScript, Asynchronous JavaScript and XML (AJAX), PHP extension (XHP), Javelin, Wireless Universal Resource File (WURFL), and the like.

In some embodiments, the social network server module 228 includes an authorization module 260 that evaluates commands, received from external processes (e.g., from applications running on a client device 104 or third-party server 110), to perform operations at the server system 108 (e.g., create, delete, or modify user information 218, connection information 220, or user content 224 for a given user). In some embodiments, authorization module 260 only evaluates commands received from untrusted processes (e.g., from an application that is not associated with the server system 108) to determine if the commanded operation was preauthorized by the server system 108 or a trusted process (e.g., by an application, associated with the server system 108, running on a client device 104 or third-party server 110). In some embodiments, authorization module 260 cross-references the command with one or more vouchers 252, stored in the memory 206 of the server system 108, to determine if the operation was pre-authorized. In some embodiments, authorization module 260 determines the validity of a voucher 252, sent with the command from the external process, to determine if the operation was pre-authorized. In some embodiments, the validity of a voucher 252 is partially dependent upon the occurrence of a specified condition precedent (e.g., receipt of the voucher 252 at the server system 108 within a specified time period).

In some embodiments, a voucher 252 (e.g., a token) explicitly specifies the pre-authorized operation. The server system 108 thus does not store state information 254 regarding pre-authorized operations for respective client devices 104. In other embodiments, a voucher 252 (e.g., a token) points to state information 254 for a respective client device 104. The state information 254 includes information about an operation; by pointing to the state information 254, the voucher pre-authorizes the operation.

Figure 3:
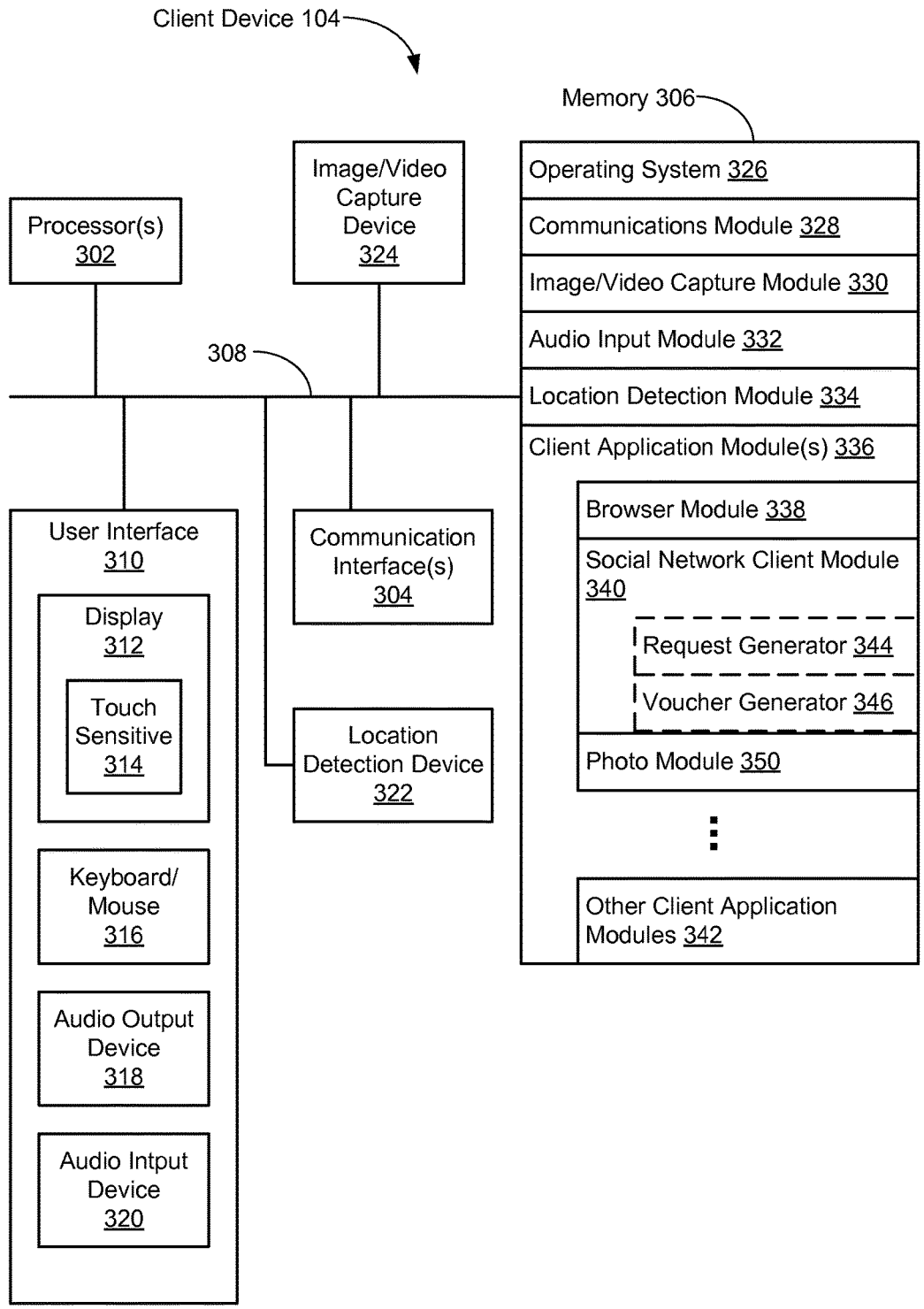
FIG. 3 is a block diagram illustrating an exemplary client device in accordance with some embodiments.

FIG. 3 is a block diagram illustrating an exemplary client device 104 in accordance with some embodiments. The client device 104 typically includes one or more processing units (processors or cores) 302, one or more network or other communications interfaces 304, memory 306, and one or more communication buses 308 for interconnecting these components. The communication buses 308 optionally include circuitry (sometimes called a chipset) that interconnects and controls communications between system components. The client device 104 includes a user interface 310. The user interface 310 typically includes a display device 312. In some embodiments, the client device 104 includes inputs such as a keyboard, mouse, and/or other input buttons 316. Alternatively or in addition, in some embodiments, the display device 312 includes a touch-sensitive surface 314, in which case the display device 312 is a touch-sensitive display. In client devices that have a touch-sensitive display 312, a physical keyboard is optional (e.g., a soft keyboard may be displayed when keyboard entry is needed). The user interface 310 also includes an audio output device 318, such as speakers or an audio output connection connected to speakers, earphones, or headphones. Furthermore, some client devices 104 use a microphone and voice recognition to supplement or replace the keyboard. Optionally, the client device 104 includes an audio input device 320 (e.g., a microphone) to capture audio (e.g., speech from a user). Optionally, the client device 104 includes a location detection device 322, such as a GPS (global positioning satellite) or other geo-location receiver, for determining the location of the client device 104. The client device 104 also optionally includes an image/video capture device 324, such as a camera or webcam.

Memory 306 includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. Memory 306 may optionally include one or more storage devices remotely located from the processor(s) 302. Memory 306, or alternately the non-volatile memory device(s) within memory 306, includes a non-transitory computer-readable storage medium. In some embodiments, memory 306 or the computer-readable storage medium of memory 306 stores the following programs, modules and data structures, or a subset or superset thereof:

- an operating system 326 that includes procedures for handling various basic system services and for performing hardware dependent tasks;
- a network communication module 328 that is used for connecting the client device 104 to other computers via the one or more communication network interfaces 304 (wired or wireless) and one or more communication networks, such as the Internet, cellular telephone networks, mobile data networks, other wide area networks, local area networks, metropolitan area networks, and so on;

an image/video capture module 330 (e.g., a camera module) for processing a respective image or video captured by the image/video capture device 324, where the respective image or video may be sent or streamed (e.g., by a client application module 336) to the social-network system 108;

an audio input module 332 (e.g., a microphone module) for processing audio captured by the audio input device 320, where the respective audio may be sent or streamed (e.g., by a client application module 336) to the social-network system 108;

a location detection module 334 (e.g., a GPS, Wi-Fi, or hybrid positioning module) for determining the location of the client device 104 (e.g., using the location detection device 322) and providing this location information for use in various applications (e.g., social network client module 340); and one or more client application modules 336, including the following modules (or sets of instructions), or a subset or superset thereof:

a web browser module 338 (e.g., Internet Explorer by Microsoft, Firefox by Mozilla, Safari by Apple, or Chrome by Google) for accessing, viewing, and interacting with web sites (e.g., a social-networking web site provided by the social-network system 108), a social network module 340 for providing an interface to a social-networking service (e.g., a social-networking service provided by social-network system 108) and related features, such as:

optionally, a request generator 344 for requesting vouchers from a server system 108 (e.g., a social-networking system) in response to receiving a first request from an untrusted process (e.g., photo module 350 or another client module 342 that is not associated with the server system 108); and optionally, a voucher generator 346 for generating vouchers in response to receiving a first request from an untrusted process (e.g., photo module 350 or another client module 342 that is not associated with the server system 108);

a photo management module 350 for organizing and storing digital photographs taken with, or loaded onto, client device 104; and/or Other optional client application modules 342, that are not associated with a server system (e.g., a social-networking system), such as applications for word processing, calendaring, mapping, weather, stocks, time keeping, virtual digital assistant, presenting, number crunching (spreadsheets), drawing, instant messaging, e-mail, telephony, video conferencing, video management, a digital music player, a digital video player, 2D gaming, 3D (e.g., virtual reality) gaming, electronic book reader, and/or workout support.

Each of the above identified modules and applications correspond to a set of executable instructions for performing one or more functions as described above and/or in the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 206 and/or 306 store a subset of the modules and data structures identified above. Furthermore, memory 206 and/or 306 optionally store additional modules and data structures not described above.

Attention is now directed towards workflows for implementing the methods described herein on a client device (e.g., the client device 104 in FIG. 3) and server system (e.g., social-networking system 108 in FIG. 2), FIGS. 4A-4D illustrate exemplary work flows for methods of linking untrusted applications (e.g., running on client device 104) to server systems (e.g., social-networking system 108) in accordance with some embodiments. The flow charts in these figures are used to illustrate the processes described below, including the processes in FIGS. 6A-6D and FIGS. 7A-7B.

As illustrated in FIGS. 4A-4D, an untrusted process (e.g., photo module 350) that is not associated with a server system (e.g., social network system 108) runs on a client device 104. The untrusted process sends a first request (e.g., request 400) to a trusted process (e.g., social network client module 340, which is associated with social network system 108) running on the client device 104 to perform a first operation (e.g., operation 410) at the server system. In response to receiving the request, the trusted process sends a command (e.g., command 402 in FIGS. 4A-4D) to the server system to perform the first operation. In response to receiving the first command, the server system performs the first operation (e.g., creating, deleting, or modifying user information 218, connection information 220, or user content 224 for a given user) because the commanding process was a trusted process. A voucher 252 is generated preauthorizing performance of a second operation at the server system upon receipt of a second command (e.g., command 408 in FIGS. 4A-4D) from the untrusted process (e.g., photo module 350), bypassing the need for the untrusted process to request the second operation through the trusted process.

In some embodiments, the voucher 252 is generated at the client device 104 (e.g., using social network client module 340). For example, in some embodiments, the trusted process (e.g., social network client module 340) generates a voucher 252 in response to receiving the first request from the untrusted process (e.g., request 400). In some embodiments, the trusted process receives instructions to generate a voucher 252 from the server system in response to sending the first command (e.g., command 402) and, in response to receiving the instructions, the trusted process generates a voucher 252.

In some embodiments, the voucher 252 is generated at the server system (e.g., at social-network system 108). For example, in some embodiments, the server system (e.g., using social network server module 228) generates a voucher 252 in response to receiving the first command (e.g., command 402) from the trusted process (e.g., social network client module 340). The server system sends the voucher 252 to the client device 104 and/or stores the voucher 252 at the server system.

In some embodiments, the voucher 252 is stored at the client device 104, regardless of where the voucher 252 was generated. In some embodiments, the voucher 252 is stored at the server system (e.g., in user information 218 in FIG. 2), regardless of where the voucher 252 was generated.

Figure 4A:
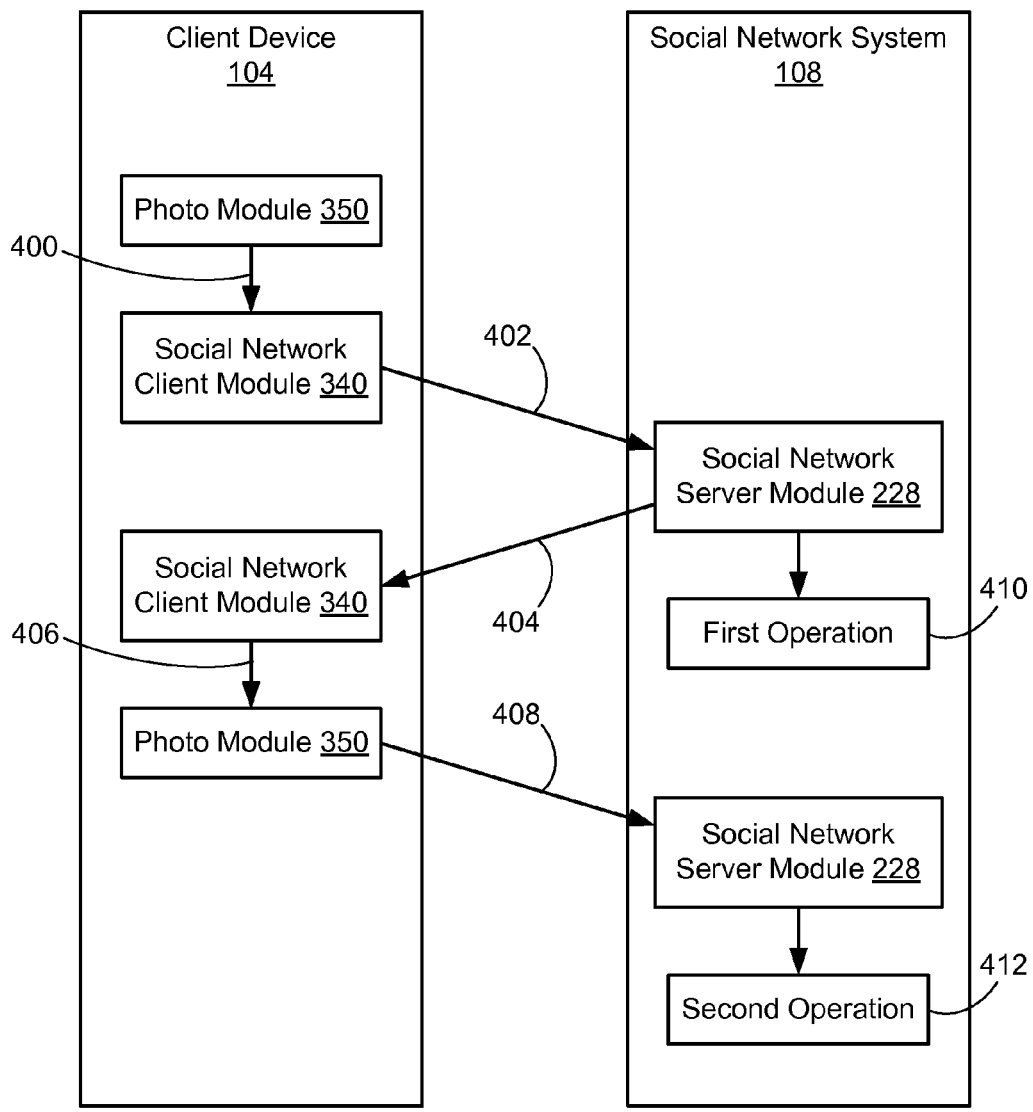
FIGS. 4A-4D are flow charts illustrating exemplary methods of linking untrusted applications to server systems in accordance with some embodiments.
Figure 5B:
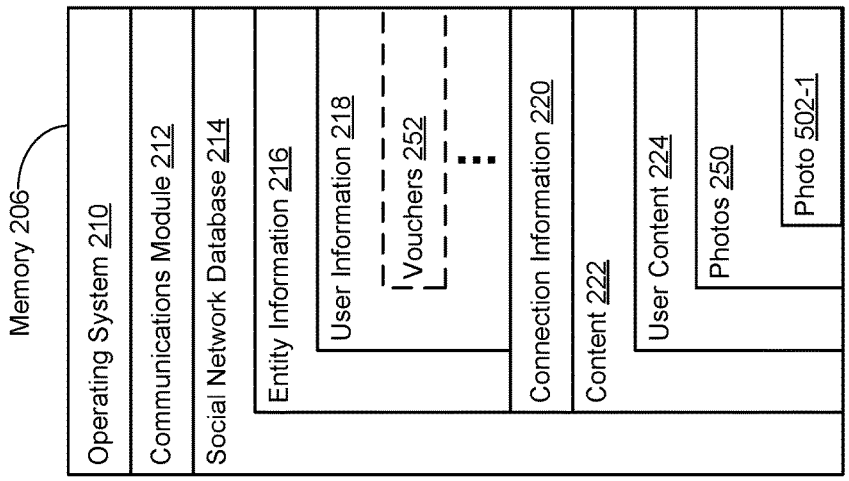
FIGS. 5B, 5D, and 5F illustrate contents of a memory in a server system that serves content for the GUIs of FIGS. 5A, 5C, and 5E in accordance with some embodiments.
Figure 5A:
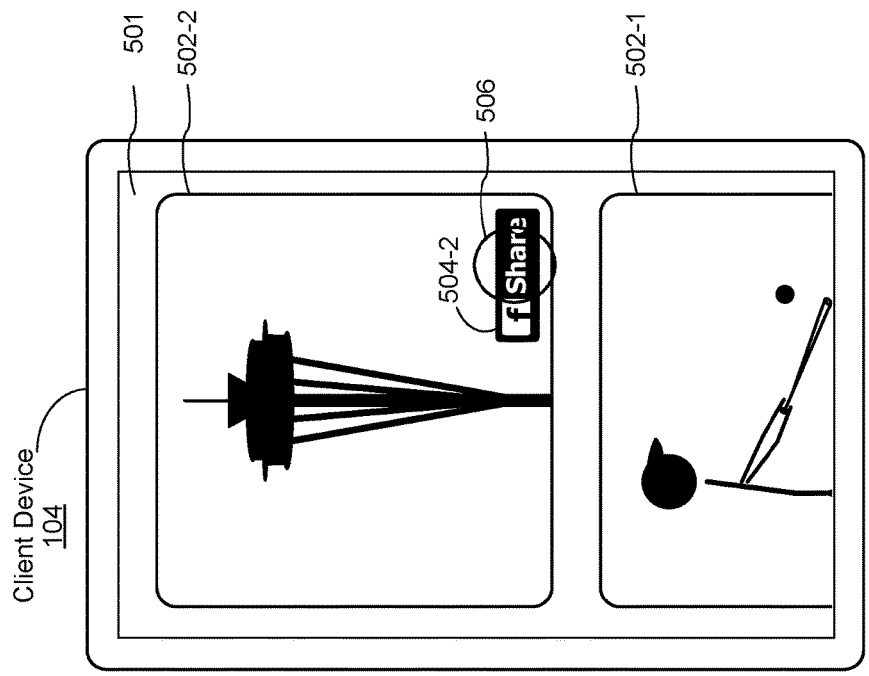
FIGS. 5A, 5C, 5E, and 5G-5I illustrate exemplary graphical user interfaces (GUIs) on a client device for linking untrusted applications to server systems in accordance with some embodiments.
Figure 5D:
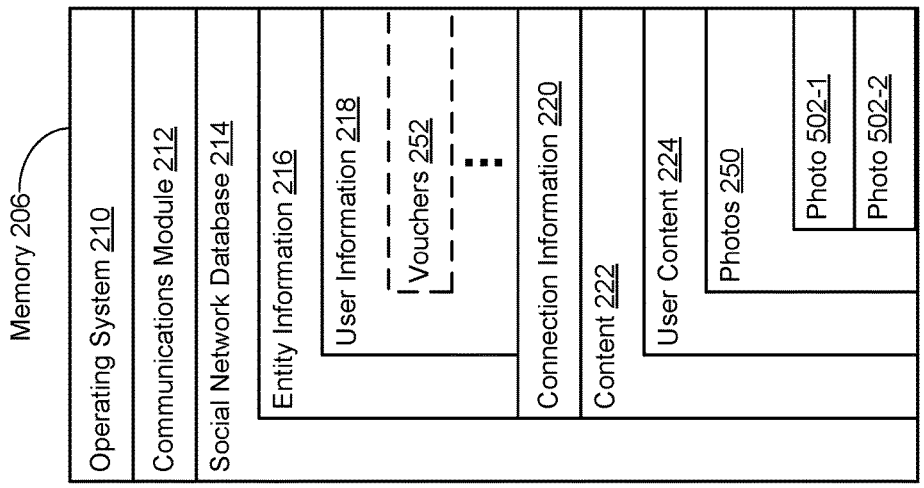

FIG. 4A illustrates an example where photo module 350 (an untrusted process), running on client device 104, sends first request 400 for performance of a first operation on social network system 108 (e.g., to add photo 502-2 to user content 224, as illustrated in FIGS. 5A-5D) to social network client module 340 (a trusted process). In response to receiving the request, social network client module 340 sends first command 402 to social-network system 108 (e.g., via social network server module 228). In response to receiving first command 402, social network system 108 performs first operation 410 (e.g., adds photo 502-2 to user content 224, as illustrated in FIG. 5D) because social network client module 340 is a trusted process with respect to social network system 108.

Still referring to FIG. 4A, social network system 108 sends communication 404 back to social network client module 340, indicating that social network system 108 will accept a second command for a particular operation or class of operations (e.g., the addition of one or more additional photos, such as photos 502-3 and 502-4, to user content 224, as illustrated in FIGS. 5E-5H) (e.g., the deletion of photo 502-2) if sent directly from photo module 350. In some embodiments, communication 404 includes a voucher, generated by social network system 108, preauthorizing the particular operation or class of operations. In some embodiments, communication 404 includes a command for social network client module 340 to generate a voucher preauthorizing the particular operation or class of operations.

Social network client module 340 then sends communication 406 pre-authorizing photo module 340 to send one or more subsequent commands for the particular operation or class of operations directly to social network system 108 (e.g., rather than sending a second request to social network client module 340). In some embodiments, communication 406 is sent directly to photo module 340. In some embodiments, communication 406 is stored in memory (e.g., memory 306 of client device 104 or memory stored on a device external to client device 104) and accessed by photo module 340 prior to sending a second request for performance of a second operation at social network system 108. In some embodiments, communication 406 includes a voucher, preauthorizing the particular operation or class of operations specified by social network system 108.

Figure 5C:
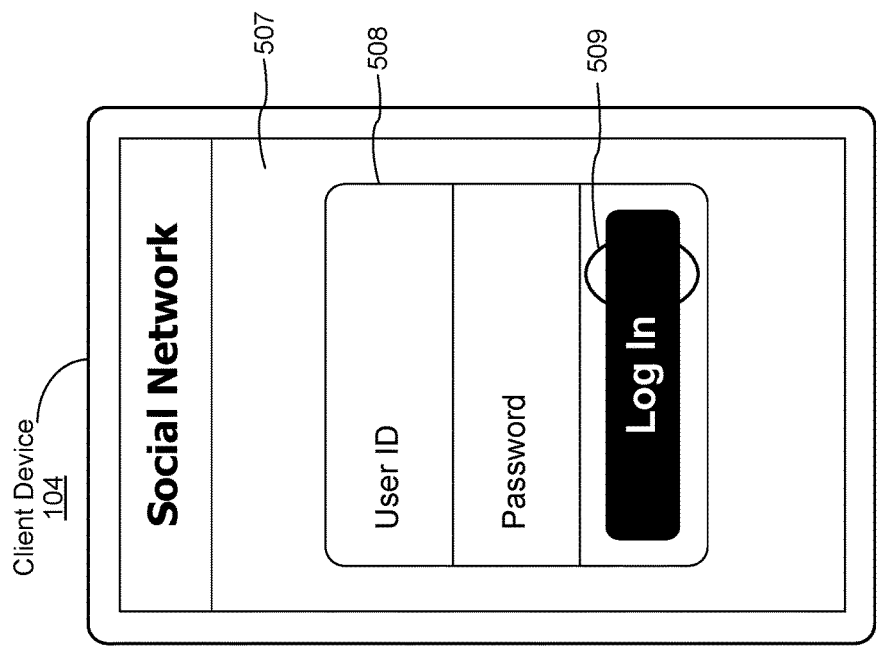
Figure 5F:
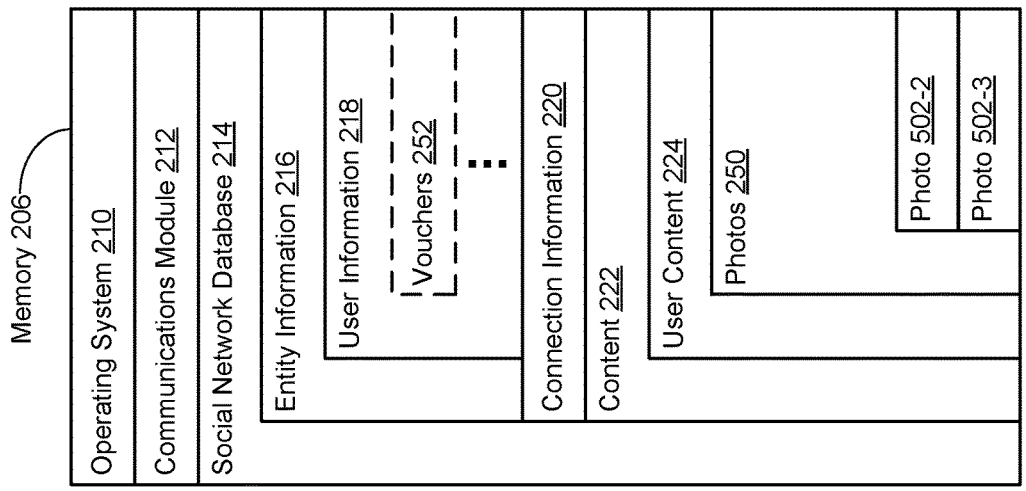
Figure 5E:
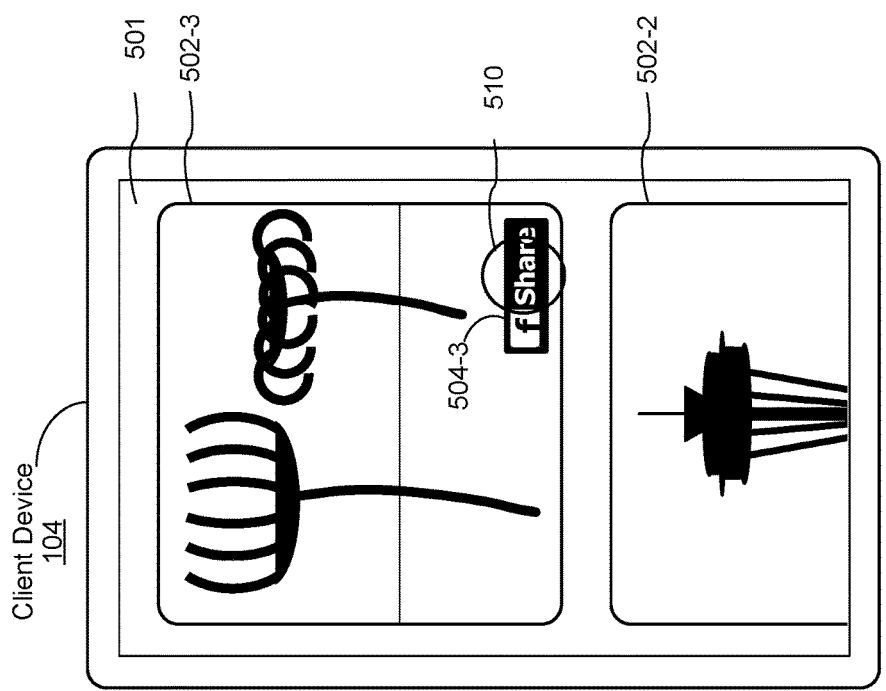

Still referring to FIG. 4A, photo module 350 then sends second command 408 for performance of a second operation, of the particular operation or class of operations pre-authorized by social network system 108 (e.g., the addition of one or more additional photos, such as photos 502-3 and 502-4, to user content 224, as illustrated in FIGS. 5E-5H) (e.g., deletion of photo 502-2 from user content 224), to social network system 108 (e.g., via social network server module 228). In response to receiving second command 408, social network system 108 performs second operation 412 (e.g., adds photo 502-3 to user content 224, as illustrated in FIGS. 5E-5F) because the particular operation or class of operations was preauthorized by voucher 252.

Figure 4B:
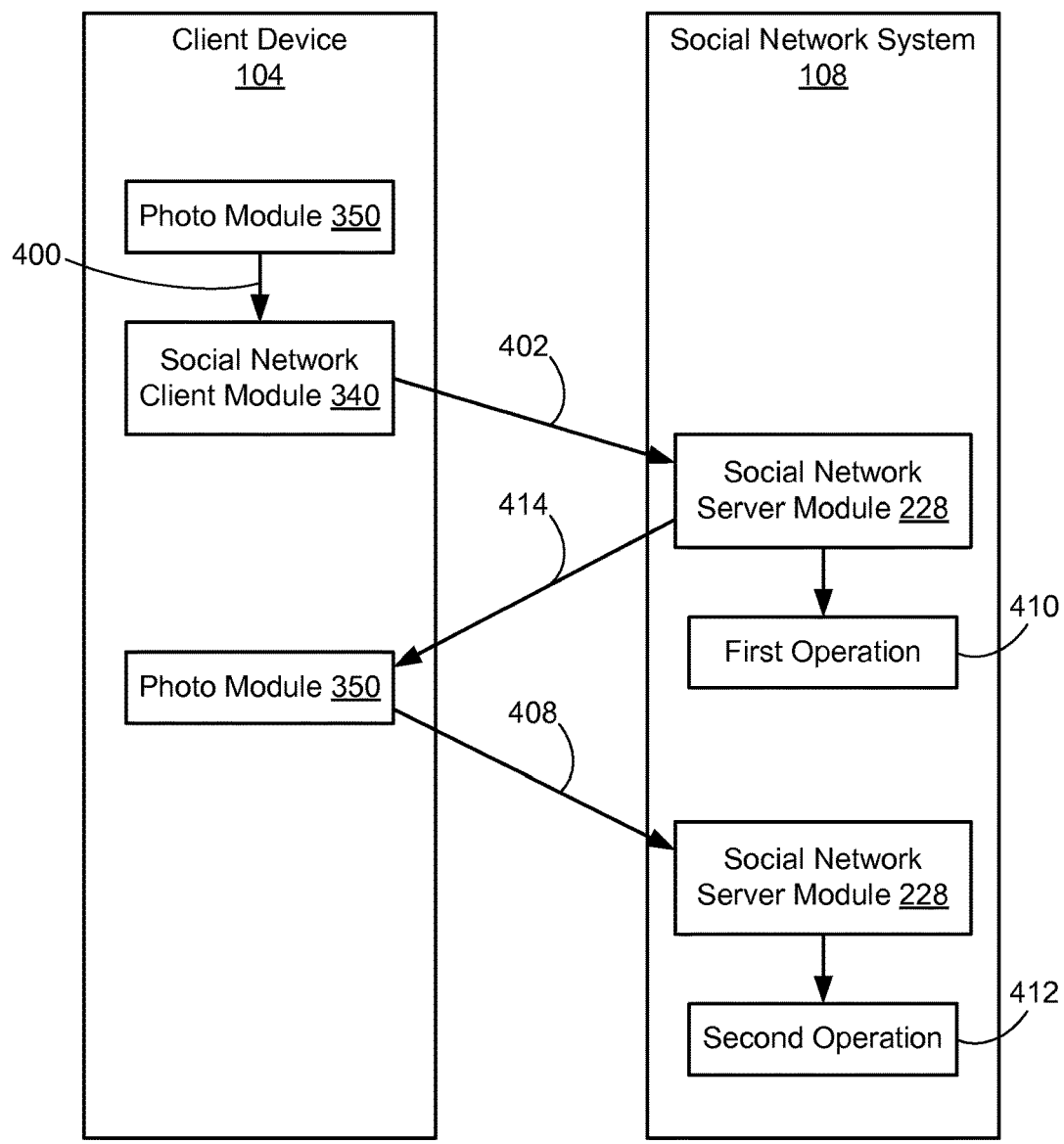

FIG. 4B illustrates a similar embodiment as FIG. 4A, except that social network system 108 does not send communication 404 to social network client module 340 after receipt of first command 402. Rather, social network system 108 sends communication 414 pre-authorizing photo module 350 to send one or more subsequent commands for a particular operation or class of operations directly to social network system 108 (e.g., rather than sending a second request to social network client module 340). In some embodiments, communication 414 includes a voucher, generated by social network system 108, preauthorizing the particular operation or class of operations.

Figure 4C:
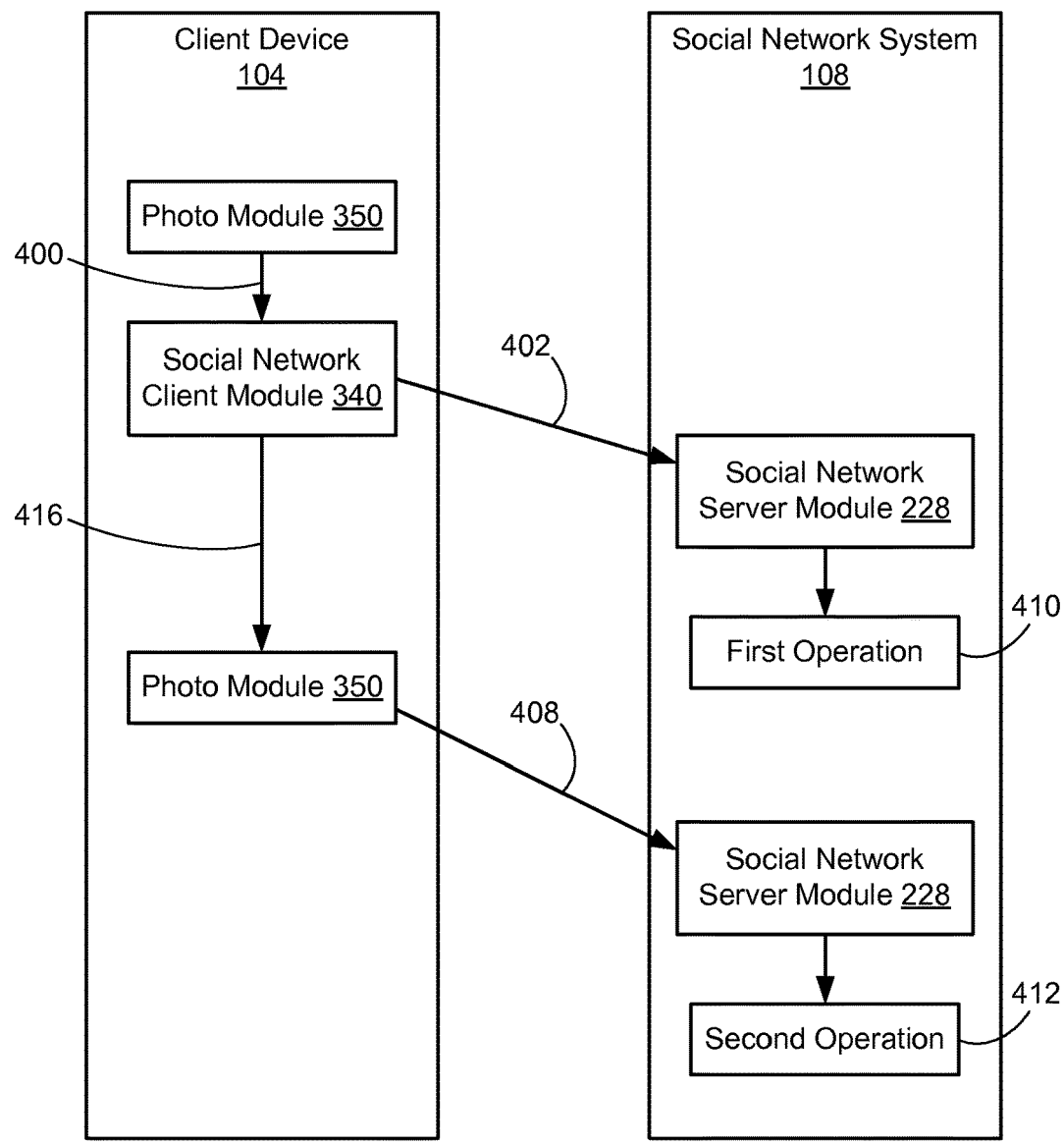

FIG. 4C illustrates another embodiment, similar to those illustrated in FIGS. 4A-4B, except that social network system 108 does not provide pre-authorization to client device 104 in response to receiving first command 402. Rather, social network client module 340 sends communication 416 to photo module 350 in response to receiving request 400 for performance of first operation 410 at social network system 108. Communication 416 pre-authorizes photo module 350 to send one or more subsequent commands for a particular operation or class of operations directly to social network system 108 (e.g., rather than sending a second request to social network client module 340). In some embodiments, communication 414 includes a voucher, generated by social network client module 340, preauthorizing the particular operation or class of operations.

In some embodiments, the voucher 252 includes a command for performance of a pre-authorized operation or class of operations (e.g., includes the second command).

Figure 4D:
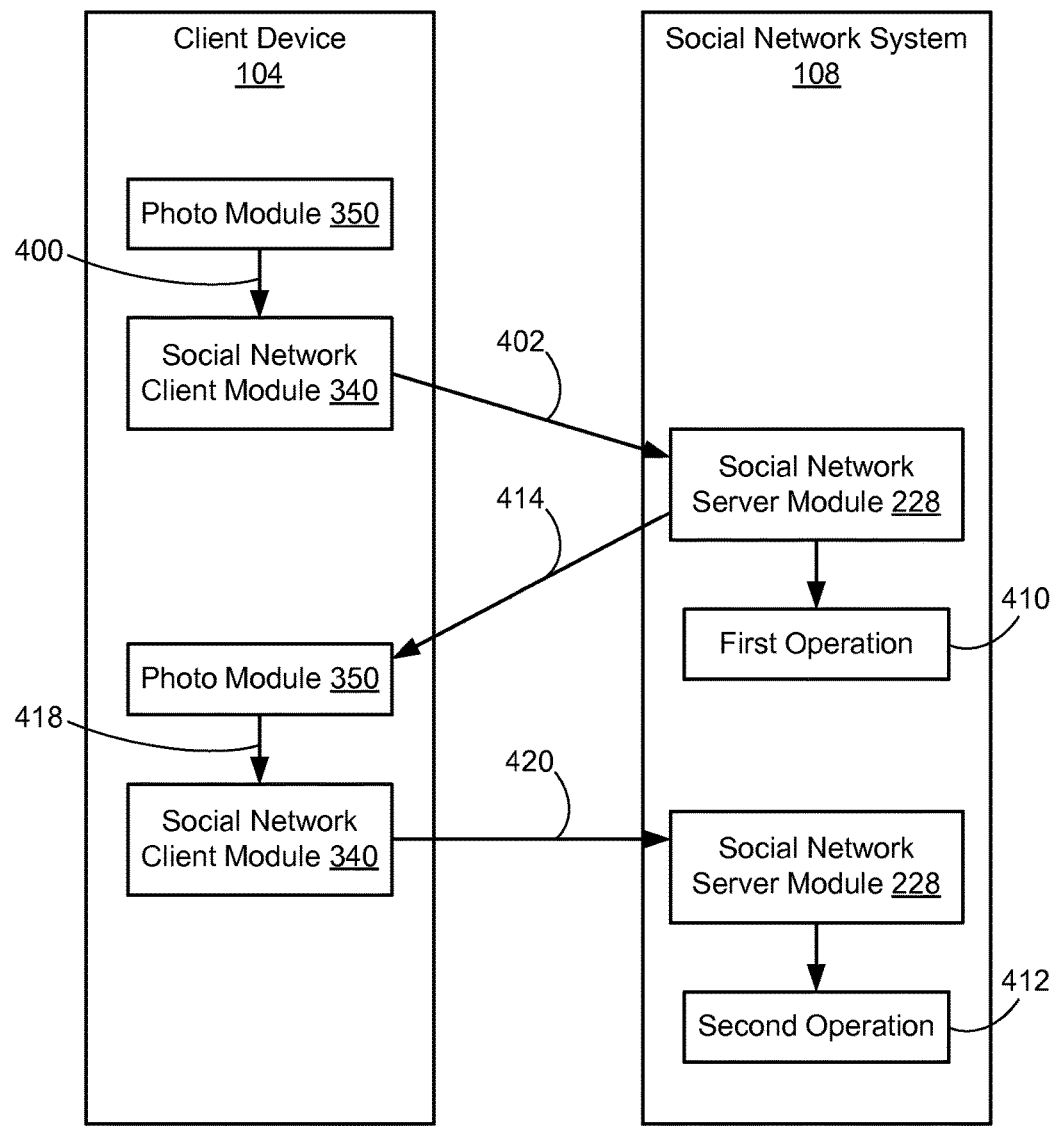

FIG. 4D illustrates another embodiment, similar to those illustrated in FIGS. 4A-4C, except that photo module 350 does not send the voucher 252 directly to social network server module 228. Rather, photo module 350 sends the voucher 252, which includes the second command, to social network client module 340 in communication 418. Social network client module 340 then presents the voucher 252 to social network server module 228 in communication 420. In some embodiments, when social network client module 340 receives the voucher (e.g., in communication 418), the device prompts the user to select a choice of preauthorized operations to be performed at social network system 108.

Attention is now directed towards embodiments of graphical user interfaces ("GUIs") and associated processes that may be implemented on a client device (e.g., the client device 104 in FIG. 3).

Figure 7A:
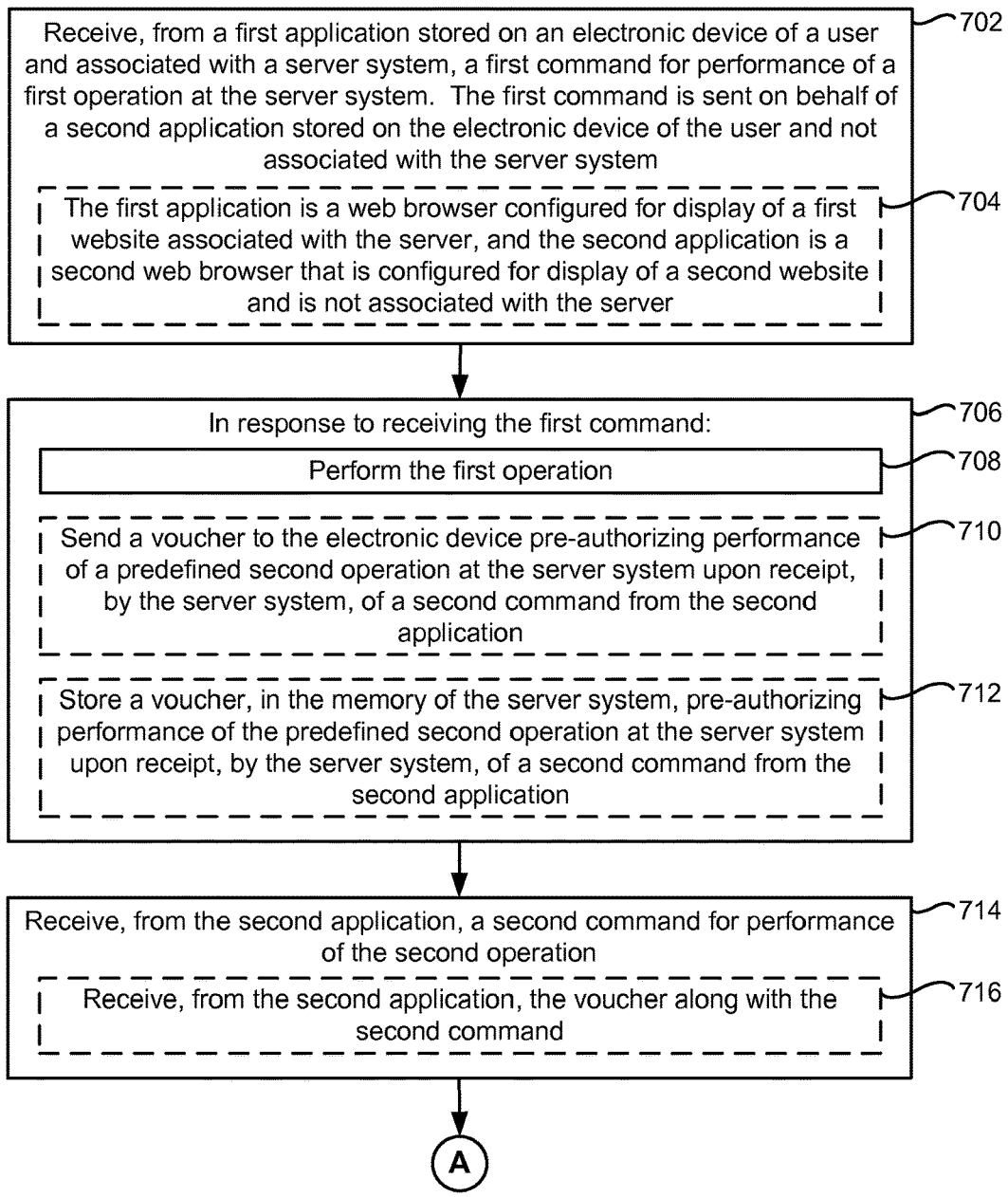
FIGS. 7A-7B are flow diagrams illustrating a method, on a server system, of linking untrusted applications to the server system, in accordance with some embodiments.
Figure 7B:
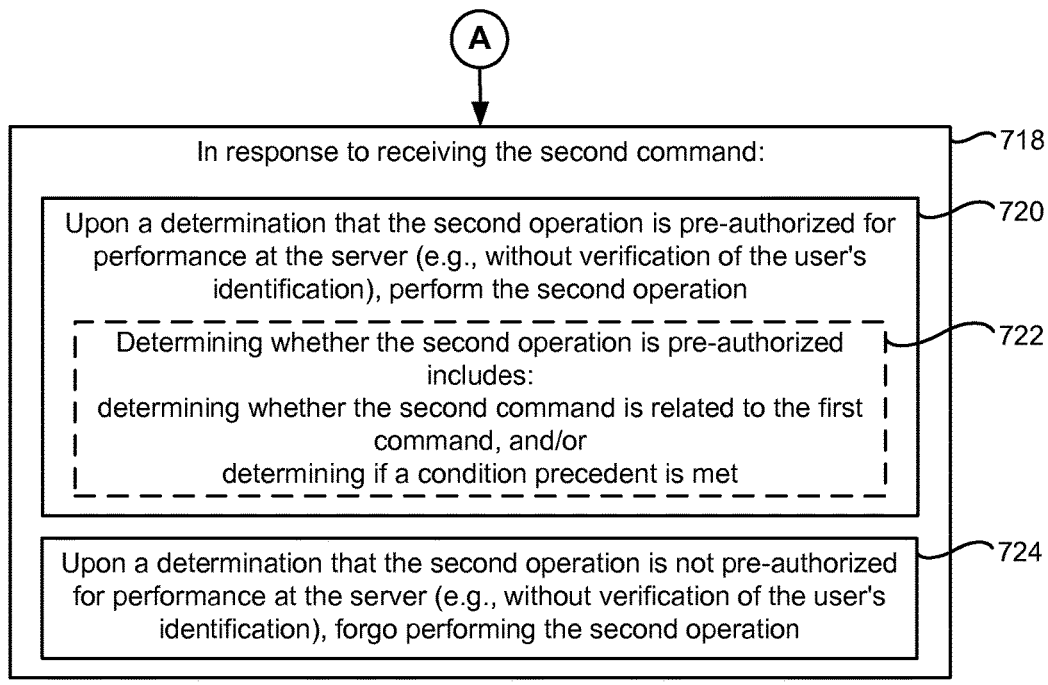

FIGS. 5A-5I illustrate exemplary GUIs on a client device 104 and associated data stored in memory 206 for linking untrusted applications to server systems in accordance with some embodiments. The user interfaces in these figures are used to illustrate the processes described below, including the method 600 (FIGS. 6A-6D) and method 700 (FIGS. 7A-7B).

In FIGS. 5A-5F photo module 350, which is an untrusted process operating on a client device 104, initially interfaces with a server system through a trusted process, operating on the client device 104, to instruct the server system to perform a first operation. After the initial interface, the untrusted application is linked to the server system such that the untrusted application can subsequently instruct the server system to perform one or more subsequent operations at the server system without having to interface with the server system through the trusted application.

In FIG. 5A, while displaying second photo 502-2 and a portion of first photo 502-1 in user interface 501 of photo module 350, client device 104 detects selection 506 (e.g., a touch contact on a touch-sensitive display or a click on a mouse or touch sensitive surface) of icon 504-2 in user interface 501. The icon 504-2 is associated with an application programming interface (API) related to the server system. In response to detection of selection 506, photo module 350 sends a request to social network client module 340 (e.g., request 400 in FIGS. 4A-4C) to add photo 502-2 to photo data store 250 of user content module 224 in memory 206 of social network system 108, illustrated in FIG. 5B.

Optionally, as illustrated in FIG. 5C, client device 104 shifts display from user interface 501 to user interface 507 of social network client module 340. In some embodiments, user interface 507 prompts the user to log-on to social network client module 340 via prompt 508 (e.g., via selection 509 of a "Log In" button), to verify the user's identity.

In some embodiments, user interface 507 prompts the user to confirm they wish to add photo 502-2 to social network system 108.

Social network client module 340 then sends a first command (e.g., command 402 in FIGS. 4A-4C) to social network system 108 to add second photo 502-2. As illustrated in FIG. 5D, photo 502-2 is added to photo data store 250 in memory 206 because social network client module 340 is associated with social network system 108.

Photo module 350 receives a voucher or indication that a voucher was created. The voucher (e.g., voucher 252) preauthorizes addition of a second photo to social network system 108 upon receipt of a second command from photo module 350 (e.g., command 408 in FIGS. 4A-4C). As illustrated in FIG. 5E, while displaying third photo 502-3 in user interface 501, client device 104 then detects selection 510 of icon 504-3. In response, photo module 350 sends the second command directly to social network system 108. As illustrated in FIG. 5F, photo 502-3 is added to photo data store 250 in memory 206 because voucher 252 preauthorized the addition of one or more photos upon receipt of a command directly from photo module 350.

In some embodiments, voucher 252 preauthorizes addition of one or more additional photos to social network system 108 only if the additional photos are captured at a location within a predetermined distance (e.g., 1000 feet) of the location at which the triggering photo (e.g., photo 502-2) was captured.

Figure 5G:
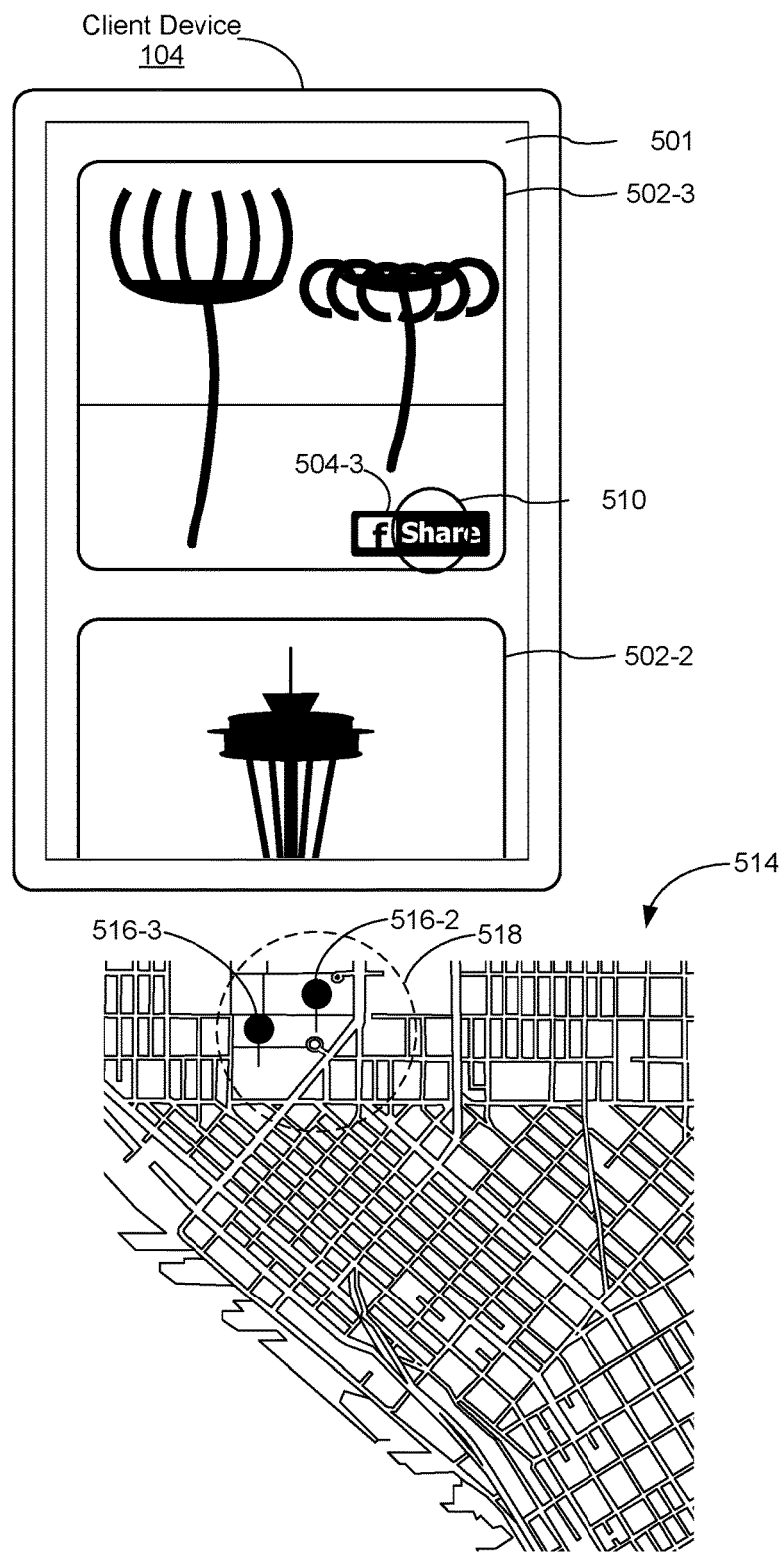

As illustrated in FIG. 5G, photo 502-2 was captured at location 516-2, indicated on street map 514. Voucher 252, generated in response to the user request to add photo 502-2 to social network system 108 (e.g., in response to request 400 or command 402, in FIGS. 4A-4C), preauthorized addition of an additional photo to social network system 108 upon receipt of a command from photo module 350 (e.g., directly from the untrusted process) under the condition that the additional photo was captured within a specified distance from location 516-2, as illustrated by circle 518 (or alternatively, a sphere) on street map 514.

In FIG. 5G, while displaying third photo 502-3 in photo module 350, client device 104 detects selection 510 of icon 504-3 in user interface 501. In response, photo module 350 sends a second command directly to social network system 108 (e.g., command 408 in FIGS. 4A-4C). As illustrated in FIG. 5F, photo 502-3 is added to photo data store 250 in memory 206 because photo 502-3 was captured at location 516-3 on street map 514, which is within the specified distance from the location as illustrated by the circle 518, meeting the criteria of the voucher.

Figure 5H:
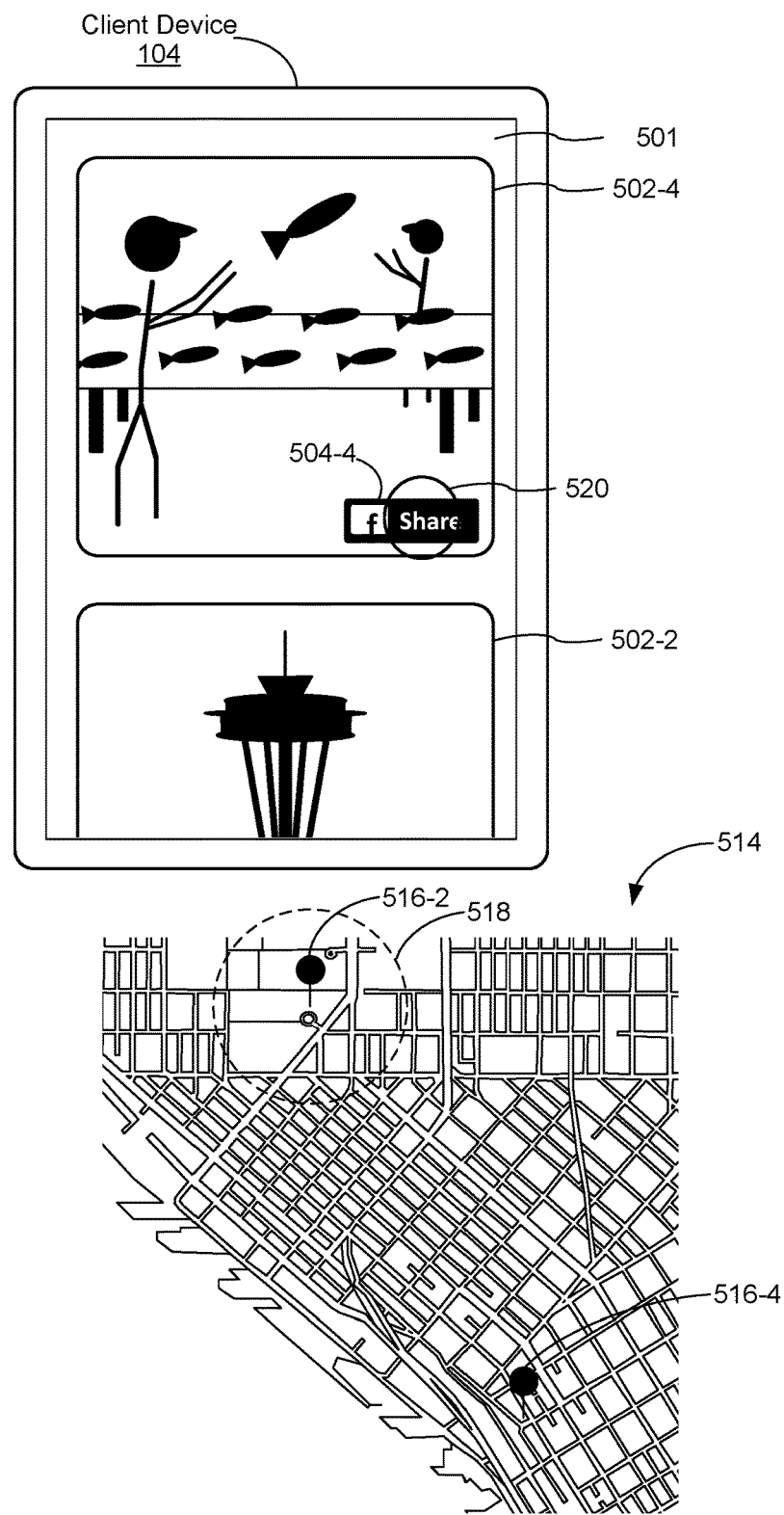

In contrast, as illustrated in FIG. 5H, while displaying fourth photo 502-4 in photo module 350, client device 104 detects selection 520 of icon 504-4 in user interface 501. In this example, photo 502-4 is not automatically added to photo data store 250 of social network system 108 in response to selection 520 because photo 502-4 was captured at location 516-4 on street map 514, which is not within the specified distance of location 516-2 as illustrated by the circle 518, failing the criteria of the voucher.

Figure 5I:
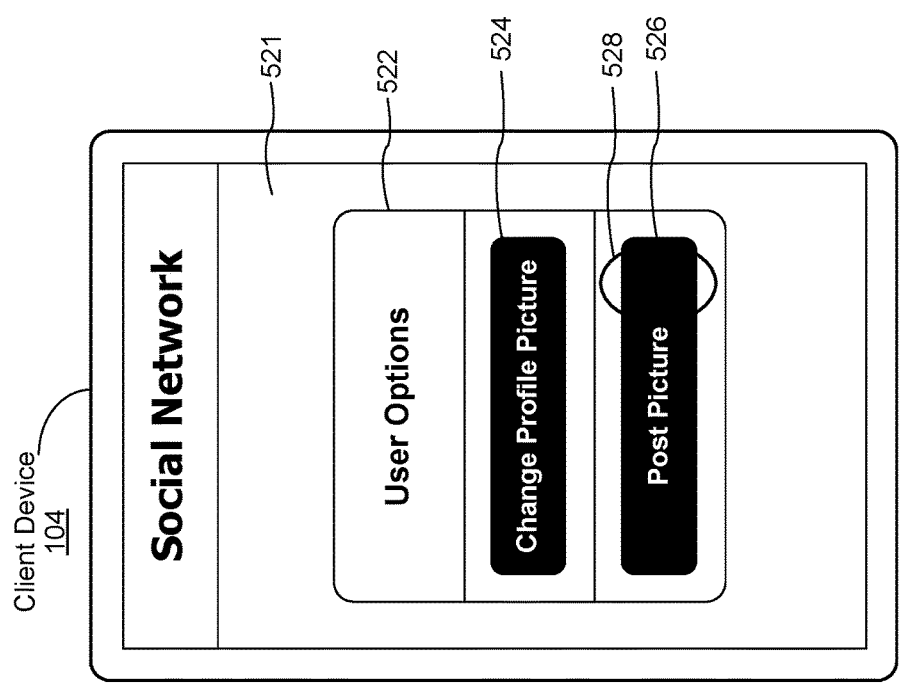
Figure 6A:
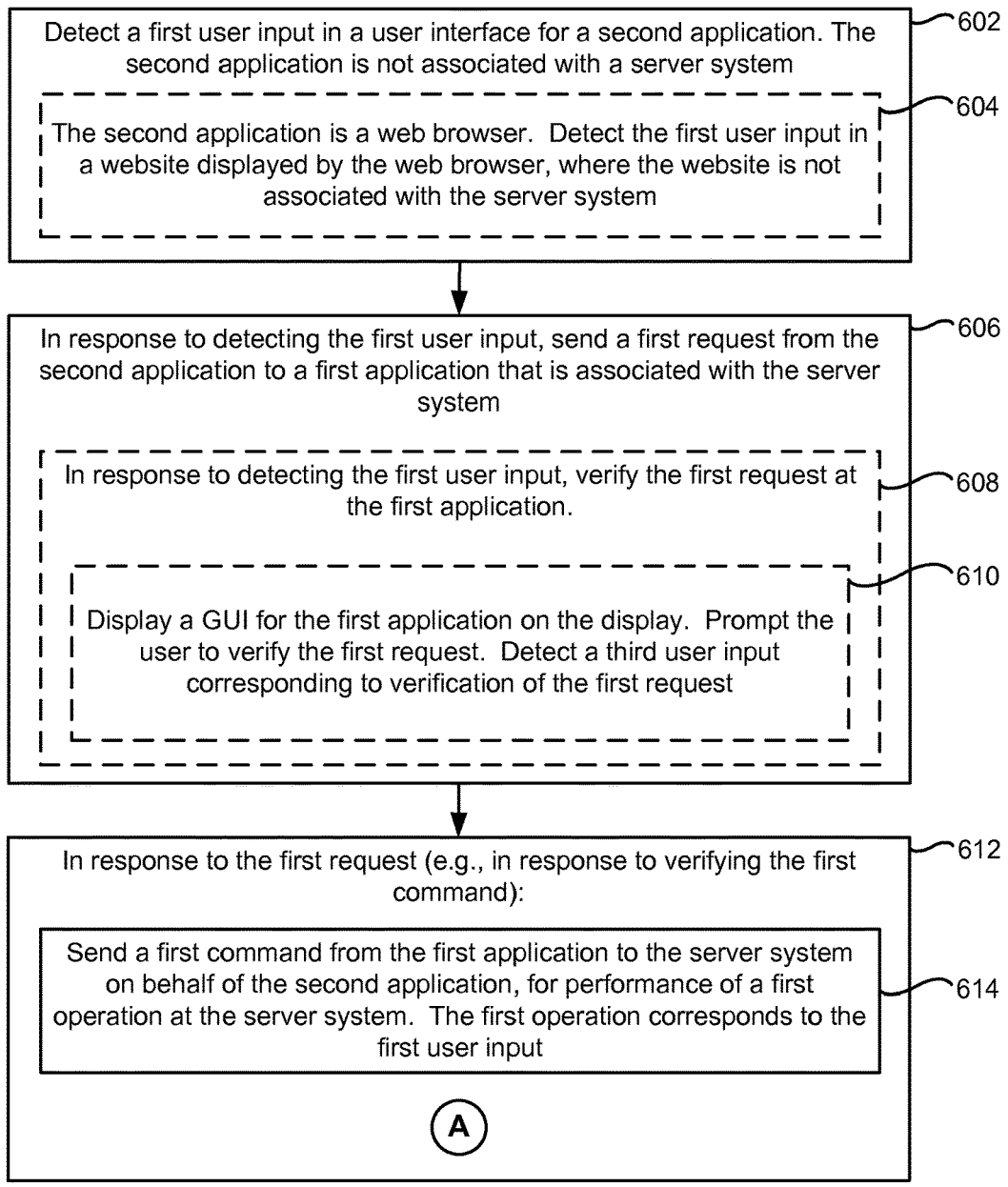
FIGS. 6A-6D are flow diagrams illustrating a method, on a client device, of linking untrusted applications to server systems in accordance with some embodiments.
Figure 6B:
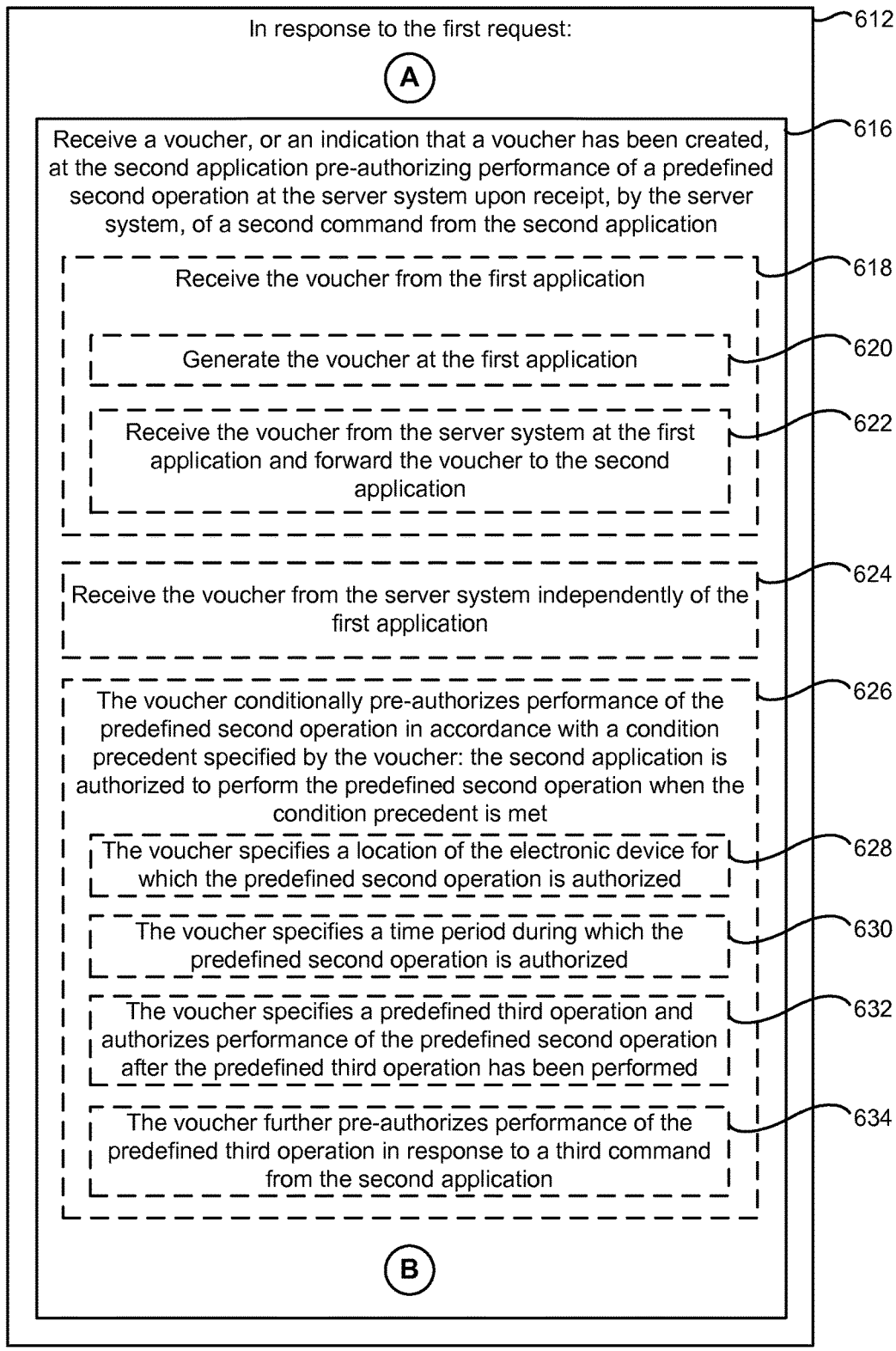
Figure 6C:
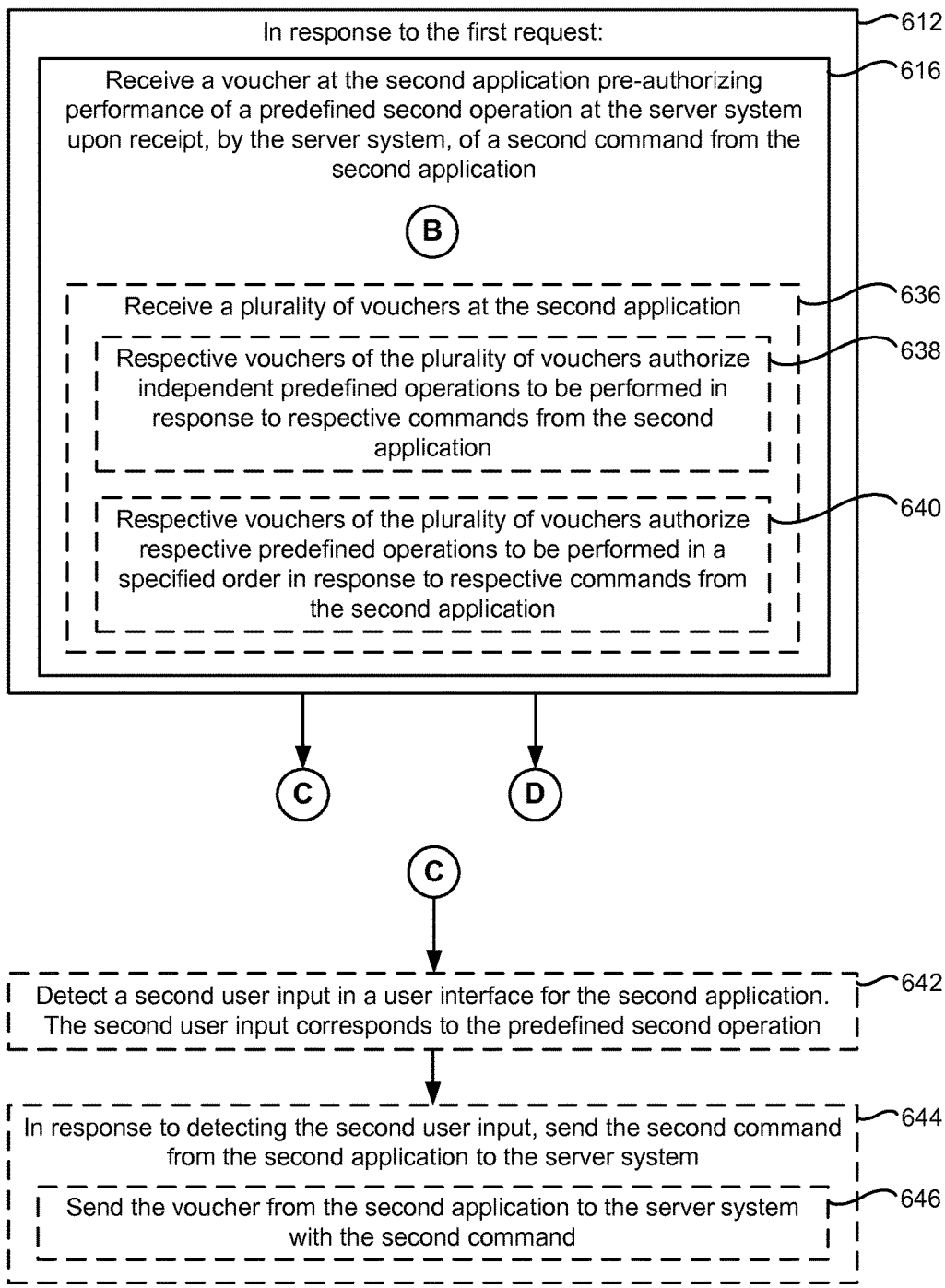
Figure 6D:
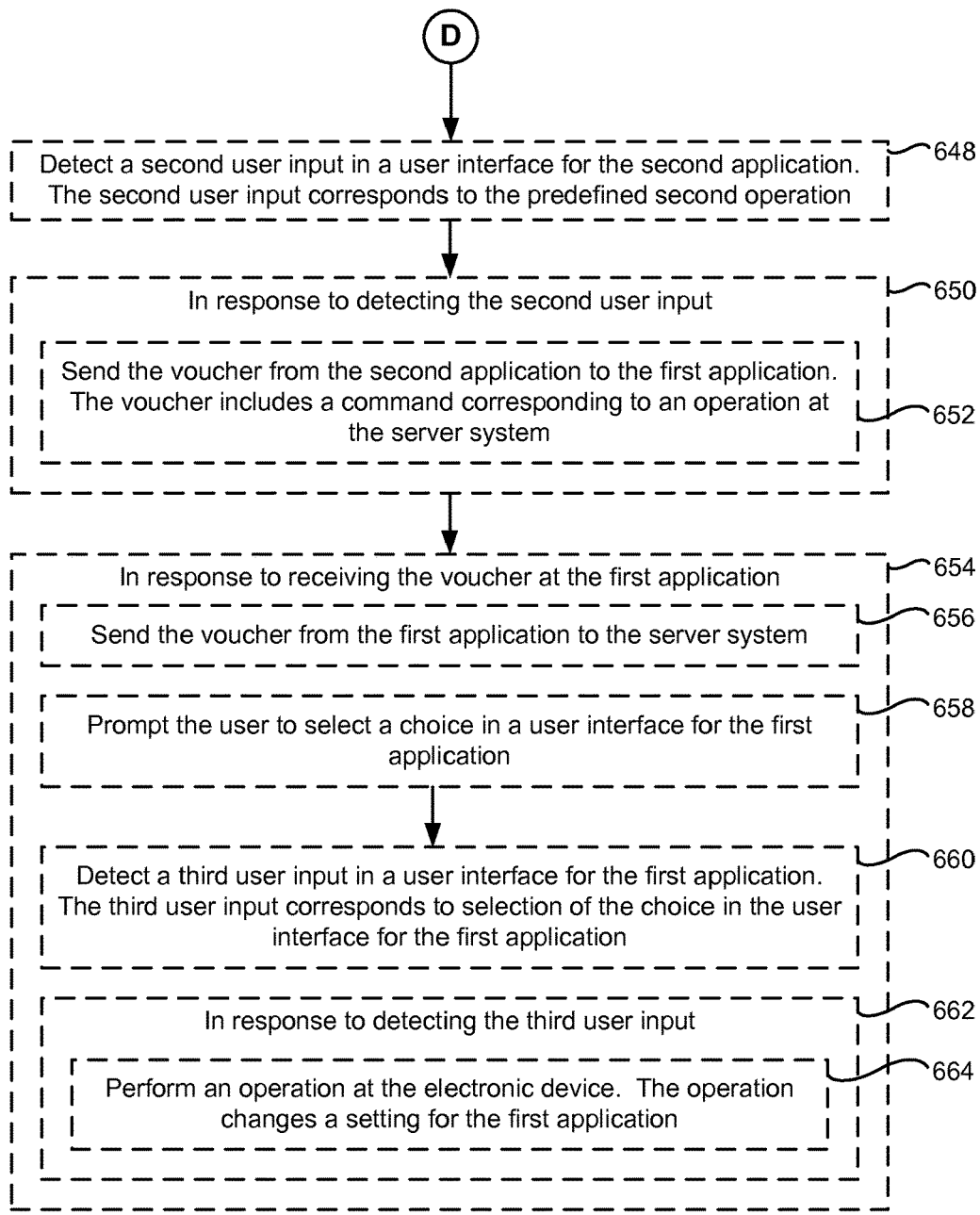

In some embodiments, where the voucher 252 is also the command, photo module 350 sends the voucher 252 to social network client module 340. As illustrated in FIG. 5I, client device 104 shifts display from user interface 501 to user interface 521 of social network client module 340, which prompts the user to select between two or more choices of preauthorized operations via prompt 522.

For example, in response to detecting selection 510 of icon 504-3, associated with photo 502-3 (e.g., as illustrated in FIG. 5E), client device 104 displays prompt 522, including choices to change the user's profile picture 524 to photo 504-3 or to add 526 photo 504-3 to photo data store 250 in memory 206. In response to detecting selection 528, photo 502-3 is added to photo data store 250, as illustrated in FIG. 5F.

FIGS. 6A-6D are flow diagrams illustrating a method 600 of linking untrusted applications on an electronic device (e.g., client device 104) to server systems. The method 600 is performed on the electronic device, which includes a display (e.g., a touch screen display 314), one or more processors (e.g., processor(s) 302), and memory (e.g., memory 306) storing a first application (e.g., social network client module 340) associated with a server system and a second application (e.g., photo module 350) not associated with the server system. FIGS. 6A-6D correspond to instructions stored in a computer memory or computer-readable storage medium (e.g., memory 306).

As described below, method 600 reduces the cognitive burden on a user when requesting performance of an operation at a server system from an untrusted application (e.g., by avoiding application switching), thereby creating a more efficient human-machine interface. For battery-operated electronic devices, enabling a user to link an untrusted application to a server system faster and more efficiently conserves power and increases the time between battery charges.

The electronic device detects (602) a first user input (e.g., selection 506 in FIG. 5A) in a user interface for a second application (e.g., user interface 501 for photo module 350 in FIG. 5A). The second application is not associated with a server system (e.g., social network system 108) and thus is not trusted by the server system. In some embodiments, the second application is a web browser (e.g., browser module 338). The device detects (604) the first user input in a website displayed by the web browser, where the website is not associated with the server system.

In response to detecting the first user input, a first request (e.g., request 400 in FIGS. 4A-4D) is sent (606) in the electronic device from the second application to a first application that is associated with the server system (e.g., a social networking application program, such as social network client module 340, or a web browser configured to display a social networking website). In some embodiments, the request is to perform an operation at the server system (e.g., to add, delete, or modify data at the server system or to access data from the server system). In some embodiments, the first application associated with the server system has a user-logged-in state (e.g., where the application is logged into the server system) and a distinct user-logged-out state (e.g., where the application is logged out of the server system). For example, the server system treats the first application as a trusted process when the user is logged into the server system and as an untrusted process when the user is logged out of the server.

In some embodiments, in response to detecting the first user input, the first application verifies (608) the first request (e.g., upon receipt of request 400 at social network client module 350). In some embodiments, the first application verifies the request without requiring user input (e.g., by determining that the user is logged into the server). In some embodiments, the first application verifies the request by prompting the user to confirm their intent to request the operation (e.g., by displaying a prompt with choices to confirm—e.g., "proceed"—or deny—e.g., "cancel"—the request to add photo 502-2 to social network server system 108). In some embodiments, the first application verifies the request by prompting the user to log into the server system. For example, the electronic device displays (610) a GUI for the first application (e.g., replacing display of the user interface for the second application on the display with display of a user interface for the first application). The GUI prompts the user to verify the request. The electronic device detects a third user input (e.g., selection 509 of a "Log In" button after entry of user ID and password, FIG. 5C) corresponding to verification of the first request.

In response to the first request (612), the electronic device sends (614) a first command (e.g., command 402 in FIGS. 4A-4D) from the first application (e.g., photo module 350) to the server system (e.g., social network system 108) on behalf of the second application (e.g., photo module 350), for performance of a first operation at the server system (e.g., adding photo 502-2 to user content 224 in FIGS. 5A-5B). The first operation corresponds to the first user input (e.g., selection 506 was performed by the user with the intent to "post" the photo 502-2 to social network server system 108).

Also in response to the first request (612), the second application (e.g., photo module 350) receives (616) a voucher (e.g., voucher 252), or an indication that a voucher has been created. The voucher pre-authorizes performance of a predefined second operation (e.g., related to the first operation) (e.g., second operation 412 in FIGS. 4A-4D) at the server system upon receipt, by the server system, of a second command from the second application (e.g., command 408 in FIGS. 4A-4C).

In some embodiments, the second application receives (618) the voucher from the first application (e.g., social network client module 340 sends photo module 350 the voucher in FIGS. 4A and 4C). In some embodiments, the first application generates (620) the voucher (e.g., using voucher generator 346) in response to receiving the first request from the second application and sends the voucher back to the second application (e.g., independently from sending the first command to the server system).

In some embodiments, the first application generates the voucher (e.g., using voucher generator 346) in response to receiving instructions from the server system (e.g., social network system 108 sends instructions to generate the voucher as part of communication 404).

In some embodiments, the first application receives (622) the voucher from the server system and forwards the voucher to the second application. For example, as illustrated in FIG. 4A, social network server module 228 generates a voucher in response to receiving first command 402, and sends the voucher to social network client module 340 on client device 104, via communication 404. Social network client module 340 then forwards the voucher to photo module 350 via communication 406.

In some embodiments, the second application receives (624) the voucher independently of the first application. For example, as illustrated in FIG. 4B, social network server module 228 generates a voucher in response to receiving first command 402, and sends the voucher to photo module 350 on client device 104, via communication 414.

In some embodiments, the voucher is not sent to the second application. Rather, the second application receives an indication that a voucher was created (e.g., from either the first application or the server system), which pre-authorizes the second application to send a command for performance of a second operation directly to the server system. For example, the server system generates and stores a voucher in response to receiving the first command (e.g., command 402 in FIGS. 4A-4D), such that the voucher is not sent to the second application.

In some embodiments, the voucher, or indication that the voucher has been created, is stored in the memory of the client device (e.g., in memory 306 of client device 104) at a location that is queried by the second application prior to sending requests to the first application. For example, social network server module 228 or social network client module 340 stores a voucher in memory 306 of client device 104. When the user prompts photo module 350 (e.g., selection 510 in FIG. 5E) to perform a second operation at social network system 108 (e.g., add photo 502-3 to user content 224 in FIGS. 5E-5F), an API (e.g., an API associated with icon 504-3 and relating to social network server system 108) instructs the second application to query a particular location in memory 306. Upon identifying a voucher corresponding to the desired second operation, or indication that the voucher has been created, the second application sends the command directly to social network system 108.

In some embodiments, the voucher pre-authorizes performance of a single, pre-defined operation at the server system (e.g., addition of, deletion of, modification of, or access to a particular type of, or specifically identified, user content or user information). Non-limiting examples of pre-defined operations include posting, removing, or modifying user content on the server system (e.g., a comment, picture, video, audio recording, or rating); adding or restricting third party access to user content on the server system (e.g., changing a privacy setting for a user or for particular user content, or "friending" or "un-friending" a third party); modifying previously posted user content (e.g., revising a comment or rating on the server system—e.g., "liking" or "disliking"); adding, removing, or updating user information (e.g., names, affiliations, contact information, passwords, personal, educational, or employment histories, public or personal display preferences); and providing information to a third party through the server system (e.g., registering for access to third-party content, making reservations, paying for goods or services, or donating funds).

In some embodiments, the voucher pre-authorizes performance of multiple pre-defined operations at the server system (e.g., a single voucher pre-authorizes multiple operations). Alternatively, multiple vouchers are issued in response to the first request, each of which pre-authorizes a respective operation (e.g., as discussed below for operation 636). In some embodiments, the multiple predefined operations are independent of each other (e.g., the voucher conditionally or unconditionally pre-authorizes the addition of any number of photos to the server system). In some embodiments, the multiple pre-defined operations are inter-related to one another. For example, the multiple pre-defined operations are hierarchically related (e.g., in a tree), such that the voucher(s) specify an order (or multiple possible orders) in which the operations can be performed.

In some embodiments, the voucher conditionally pre-authorizes (626) performance of the predefined second operation in accordance with a condition precedent specified by the voucher (e.g., the second application is authorized to command the server system to perform the predefined second operation once the condition precedent is met). Non-limiting examples of conditions precedent include temporal conditions (e.g., the second command must be sent by the second application or received at the server system within a predefined time of the first command, or a previous command in a series of pre-authorized operations), proximity conditions (e.g., the second command must be initiated from a location within a predefined distance of a location associated with the first command, or a previous command in a series of pre-authorized operations, such as a location at a command was initiated or at which a photo, video, or audio recording was captured), or operational conditions (e.g., some act, operation, or state operation—in addition to sending the first command—must occur prior to sending the command for the second operation).

The series of FIGS. 5A-5D-5G-5F illustrates a case in which a condition precedent is met, and thus the voucher pre-authorizes performance of the second operation at the server system.

In contrast, the series of FIGS. 5A-5D-5H-5D illustrates a case in which a condition precedent is not met, and thus the voucher does not pre-authorize performance of the second operation is not performed at the server system.

In one embodiment, the voucher, or multiple vouchers, pre-authorize an undetermined number of subsequent operations, so long as the condition precedent is satisfied for each operation. In another embodiment, the voucher, or multiple vouchers, pre-authorize up to a predetermined number of subsequent operations (e.g., up to 10), so long as the condition precedent is satisfied for each operation.

In some embodiments, the voucher specifies a location of the electronic device for which the predefined second operation is authorized (628). For example, in some embodiments, the voucher specifies a particular location, or set of locations, from which a command may be sent directly from an otherwise untrusted process to the server system for performance of the predefined second operation. When the command is sent from a location other than the particular location, or set of locations, specified by the voucher, the second operation is not authorized for performance at the server system. In some embodiments, the location specified by the voucher is independent of the location from which the first command was sent (e.g., the user's home address). In some embodiments, the location specified by the voucher is dependent upon the location from which the first command was sent (e.g., the specified location is the same location or an area within a predetermined distance from the same location).

In some embodiments, the specified location is a single location (e.g., a user's residence, workplace, or business, a business associated with the first command, a public park). In some embodiments, the specified location is a contiguous or non-contiguous set of locations. For example, in one embodiment, the specified location is a contiguous set of all locations within a certain distance of a location associated with the first command.

In some embodiments, where the voucher, or vouchers, pre-authorizes multiple subsequent operations at the server system, the location specified by the voucher is dependent upon a location associated with a prior command. For example, in one embodiment, each subsequent command must be sent from a location within a defined distance of the location at which the previous command was sent. In this fashion, for example, a fourth command in a particular chain of operations (e.g., related to a voucher specifying that each subsequent command must be sent from a location within 1000 feet of the previous command) may be authorized although it occurs at a great distance from where the first command was sent (e.g., 3000 feet away).

Conversely, in some embodiments, where the voucher, or vouchers, pre-authorizes multiple subsequent operations at the server system, the location specified by the voucher is independent from a location associated with a prior command, or only dependent upon a location associated with the first command. For example, each subsequent command must be sent from a location within a defined distance of the location at which the first command was sent.

In some embodiments, the voucher specifies a time period during which the predefined second operation is authorized (630). For example, the specified time period is dependent upon the time at which the first operation was performed (e.g., preauthorizing one or more operations within a specified time period following performance of the first operation). In one embodiment, the specified time period is independent of the time at which the first operation was performed (e.g., preauthorizing one or more operations at a set time, such as a specified day, week, month, or other unit of time). In some embodiments, the specified time period is a non-contiguous set of time periods (e.g., preauthorizing one or more operations on the birthdays of each friend of a user).

In some embodiments, where the voucher, or vouchers, pre-authorizes multiple subsequent operations at the server system, the time period specified by the voucher is dependent upon a time period associated with a prior command. For example, in one embodiment, each subsequent command must be sent within a time period following the time at which the previous command was sent.

Conversely, in some embodiments, where the voucher, or vouchers, pre-authorizes multiple subsequent operations at the server system, the time period specified by the voucher is independent from the time of a prior command, or only dependent upon a time associated with the first command. For example, each subsequent command must be sent within a defined time period following performance of the first operation.

In some embodiments, the voucher specifies a predefined third operation and authorizes performance of the predefined second operation after the predefined third operation has been performed (632). For example, in one embodiment, in response to registering with a business on the server system, a voucher is issued pre-authorizing a payment at the server system, dependent upon the user registering valid credit card information on the server system. In some embodiments, the voucher further pre-authorizes performance of the predefined third operation in response to a third command from the second application (634).

In one embodiment, the authorization for subsequent operations is terminated by a condition subsequent, even if the condition precedent continues to be met. For example, in one embodiment, where the condition precedent is that all subsequent commands are sent from within a predefined distance of the location at which the first command was sent, a condition subsequent may require that the electronic device not travel a second predefined distance from the location at which the first command was sent. Similarly, in some embodiments, a voucher pre-authorizing an operation according to a condition precedent expires after a predefined time, i.e., the passage of the predefined time is a condition subsequent nullifying the pre-authorization of subsequent operations.

In some embodiments, in response to the first request (e.g., request 400 in FIGS. 4A-4D), the electronic device (e.g., client device 104) receives (636) a plurality of vouchers at the second application (e.g., photo module 350 in FIGS. 4A-4D). In some embodiments, respective vouchers of the plurality of vouchers pre-authorize independent predefined operations (e.g., a voucher is issued for each pre-authorized operation) to be performed in response to respective commands from the second application (638). For example, in one embodiment, in response to sending a request that a photo be added to a server system, a photo sharing application (e.g., that is not associated with the server system) receives ten vouchers, each of which pre-authorizes the addition of one photo to the server system. Each voucher in the plurality of vouchers thus may be an independent voucher (e.g., the execution of an operation pre-authorized by one of the plurality of vouchers does not depend upon the execution of an operation pre-authorized by any other voucher in the plurality of vouchers). In some embodiments, respective vouchers of the plurality of vouchers authorize multiple predefined operations (e.g., a voucher is issued for each set of related pre-authorized operations). For example, in one embodiment, in response to sending a request that a photo be added to a server system, photo module 350 receives a first voucher pre-authorizing addition of ten photos to the server system and a second voucher pre-authorizing removal of ten photos from the server system.

In some embodiments, respective vouchers of the plurality of vouchers authorize (640) respective predefined operations to be performed in a specified order in response to respective commands from the second application. For example, in response to sending a request for registration at the server system with a subscription content provider (e.g., a publisher of digital newspapers), the second application (e.g., an application associated with the publisher) receives a plurality of vouchers pre-authorizing operations that lead to access of digital content at the server system, including a first voucher for requesting access to a particular digital content on the server system (e.g., digital content from a local newspaper), a second voucher for entering credit card information at the server system, a third voucher for processing payment at the server system (e.g., paying the publisher for access to digital content from the local newspaper), and a fourth voucher for accessing the digital content (e.g., reading an article from the local newspaper on the server system). The vouchers must be used in order, such that the user pays for access to the digital content before they are allowed to access it at the server system. Thus, one or more vouchers in the plurality of vouchers may be dependent on one or more other vouchers in the plurality of vouchers (e.g., the execution of an operation pre-authorized by one of the plurality of vouchers depends upon, and thus is contingent on, the execution of one or more operations pre-authorized by one or more of the other vouchers in the plurality of vouchers).

In some embodiments, the electronic device detects (642) a second user input in a user interface for the second application (e.g., selection 510 in FIG. 5E). The second user input corresponds to the predefined second operation (e.g., the predefined operation or class of operations pre-authorized by the voucher, such as addition of photo 502-3 to social networking system 108 in FIG. 5E).

In response to detecting the second user input, the second application sends (644) the second command to the server system (e.g., independently of the first application). For example, command 408 is sent from photo module 350 to social network system 108 in FIGS. 4A-4D (e.g., rather than sending a second request from photo module 350 to social network client module 340). In some embodiments, the second command is sent to the server system without determining the user-log-in state of the first application (e.g., without confirming the user is logged into the server system at the client device). Likewise, in some embodiments, the second command is sent to the server system without displaying the GUI for the first application (e.g., without asking for user verification or approval). In some embodiments, this provides a smoother user experience by not switching back-and-forth between user interfaces when effectuating operations at the server system from the client device.

In some embodiments, the electronic device sends (646) the voucher from the second application to the server system with the second command (e.g., communication 408 includes the second command and the voucher in FIGS. 4A-4D).

In some embodiments, the electronic device detects (648) a second user input in a user interface for the second application (e.g., selection 510 in FIG. 5E). The second user input corresponds to the predefined second operation (e.g., the predefined operation or class of operations pre-authorized by the voucher, such as addition of photo 502-3 to social networking system 108 in FIG. 5F). In some embodiments, the voucher includes a command corresponding to an operation at the server system (e.g., the voucher is the second command for performance of second operation 412, as illustrated in FIGS. 4A-4D).

In response to detecting the second user input (650), the second application sends (652) the voucher from the second application to the first application (e.g., photo module 350 sends the voucher 252 to social network client module 340 via communication 418, as illustrated in FIG. 4D). In response to receiving the voucher at the first application (654), the device sends (656) the voucher from the first application to the server system (e.g., social network client module 340 sends the voucher 252 to social network server module 228 via communication 420, as illustrated in FIG. 4D).

In some embodiments, in response to receiving the voucher at the first application (654), the device prompts (658) the user to select a choice in a user interface for the first application. For example, as illustrated in FIG. 5I, client device 104 displays user interface 522 for social network client module 340 and prompts the user to choose whether to change their profile picture (e.g., by selecting choice 524) or post a picture on their account (e.g., by selecting choice 528).

The device detects (660) a third user input in a user interface for the first application (e.g., selection 526 in user interface 522 for social network client module 340, as illustrated in FIG. 5I). The third user input corresponds to selection of the choice in the user interface for the first application (e.g., selection 526 indicates that the user wishes to post the picture, rather than changing their profile picture).

In response to detecting the third user input (662), the device performs (664) an operation at the electronic device. The operation changes a setting for the first application. For example, selection of choice 526 in user interface 522 changes the display of the user's profile picture in social network client module 340.

FIGS. 7A-7B are flow diagrams illustrating a method 700 of linking untrusted applications to server systems in accordance with some embodiments. The method 700 is performed on the server system (e.g., social-network system 108) and is a counterpart to the method 600 in accordance with some embodiments. FIGS. 7A-7B correspond to instructions stored in a computer memory or computer-readable storage medium (e.g., memory 206).

The method 700 reduces the cognitive burden on a user when requesting performance of an operation at a server system from an untrusted application, thereby creating a more efficient human-machine interface. For battery-operated electronic devices, enabling a user to link an untrusted application to a server system faster and more efficiently conserves power and increases the time between battery charges.

The server system receives (702), from a first application stored on an electronic device of a user and associated with (i.e., trusted by) the server system, a first command for performance of a first operation at the server system (e.g., social network system 108 receives command 402 for performance of operation 410). The first command is sent on behalf of a second application stored on the electronic device of the user and not associated with the server system (e.g., on behalf of photo module 350 in FIGS. 4A-4D).

In some embodiments, the first application is a web browser configured for display of a first website associated with the server (e.g., a web browser displaying a website for social network server 108), and the second application is a second web browser that is configured for display of a second website (704) and is not associated with the server (e.g., a web browser displaying a photo sharing website). Alternatively, the first application is a dedicated application (e.g., social network client module 340) specific to the server system.

In response to receiving the first command (706), the server system performs (708) the first operation (e.g., operation 410 in FIGS. 4A-4D). For example, as illustrated in FIGS. 5A-5D, social network system 108 receives a command to add photo 502-2 to memory 206. In response, social network system 108 adds photo 502-2 to photo data store 250, as illustrated in FIG. 5D.

In some embodiments, the server system sends (710) a voucher to the electronic device pre-authorizing performance of a predefined second operation at the server system upon receipt, by the server system, of a second command from the second application (e.g., social network system 108 sends communication 404, including voucher 252 pre-authorizing operation 412, to client device 206 in FIGS. 4A-4B).

In some embodiments, the server system stores (712) a voucher in the memory of the server system (e.g., in user information 218 of memory 206 in FIG. 2), pre-authorizing performance of the predefined second operation (e.g., operation 412 in FIGS. 4A-4D) at the server system upon receipt, by the server system, of a second command (e.g., command 408 in FIGS. 4A-4C or command 420 in FIG. 4D) from the second application.

The server system then receives (714), from the second application, a second command to perform the second operation (e.g., command 408 for performance of operation 412, FIGS. 4A-4C or command 420 in FIG. 4D). In some embodiments, the server system receives (716), from the second application, the voucher along with the second command (e.g., communication 408 includes the second command and the voucher in FIGS. 4A-4C). In some embodiments, the voucher is (or includes) the second command (e.g., communication 420 in FIG. 4D).

In response to receiving the second command (718), the server system, upon a determination that the second operation is pre-authorized for performance at the server (e.g., without verification of the user's identification), performs (720) the second operation. For example, as illustrated in FIGS. 4A-4C, in response to receiving command 408, social network server 108 verifies the command is pre-authorized by a voucher (e.g., a voucher stored in user information 218 of memory 206 in FIG. 2 or a voucher sent with the second command in communication 408 in FIGS. 4A-4C) and performs second operation 412 (e.g., adds photo 502-3 to photo store 250 in memory 206, as illustrated in FIGS. 5E-5F).

In some embodiments, determining whether the second operation is pre-authorized includes (722) determining whether the second command is related to the first command (e.g., determining that command 408 is related to command 400 in FIGS. 4A-4C), and/or determining if a condition precedent is met (e.g., determining if photo 502-3 was captured at a location within a predetermined distance of the location at which photo 502-2 was captured in FIG. 5G).

Alternatively, in response to receiving the second command (718), the server system, upon a determination that the second operation is not pre-authorized for performance at the server (e.g., without verification of the user's identification), forgoes (724) performing the second operation. For example, as illustrated in the series of FIGS. 5A-5D-5H-5D, social network system 108 does not add photo 502-4 to memory 206 in FIG. 5D because the second command (e.g., command 408 in FIGS. 4A-4C or command 420 in FIG. 4D) does not meet a required condition precedent (e.g., because photo 502-4 was captured at a location more than 1000 feet from the location at which photo 502-2 was captured).

For situations in which the systems discussed above collect information about users, the users may be provided with an opportunity to opt in/out of programs or features that may collect personal information (e.g., information about a user's preferences or a user's contributions to social content providers). In addition, in some embodiments, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
   at an electronic device having a display, one or more processors, and memory, the memory storing one or more programs for execution by the one or more processors, including a first application associated with a server system and a second application not associated with the server system:

detecting a first user input in a user interface for the second application;

in response to detecting the first user input, sending a first request from the second application to the first application; and in response to the first request:
- sending a first command from the first application to the server system on behalf of the second application, for performance of a first operation at the server system, the first operation corresponding to the first user input; and
- receiving a voucher at the second application pre-authorizing performance of a predefined second operation at the server system upon receipt, by the server system, of a second command from the second application.

2. The method of claim 1, further comprising:
detecting a second user input in the user interface for the second application, the second user input corresponding to the predefined second operation; and in response to detecting the second user input, sending the second command from the second application to the server system.

3. The method of claim 2, further comprising sending the voucher from the second application to the server system with the second command, in response to detecting the second user input.

4. The method of claim 1, further comprising, in response to detecting the first user input, verifying the first request at the first application;
wherein sending the first command from the first application to the server system is performed upon verifying the first request.

5. The method of claim 1, wherein receiving the voucher at the second application comprises receiving the voucher from the first application.

6. The method of claim 5, further comprising generating the voucher at the first application.

7. The method of claim 5, further comprising receiving the voucher from the server system at the first application, wherein the first application forwards the voucher to the second application.

8. The method of claim 1, wherein receiving the voucher at the second application comprises receiving the voucher from the server system independently of the first application.

9. The method of claim 1, wherein the voucher conditionally pre-authorizes performance of the predefined second operation in accordance with a condition precedent specified by the voucher, the second application being authorized to perform the predefined second operation when the condition precedent is met.

10. The method of claim 9, wherein the voucher specifies a location of the electronic device for which the predefined second operation is authorized.

11. The method of claim 9, wherein the voucher specifies a time period during which the predefined second operation is authorized.

12. The method of claim 9, wherein the voucher specifies a predefined third operation and authorizes performance of the predefined second operation after the predefined third operation has been performed.

13. The method of claim 9, wherein the voucher further pre-authorizes performance of a predefined third operation in response to a third command from the second application.

14. The method of claim 1, wherein:
the voucher is a first voucher; and
the method further comprises receiving, in response to the first request, a plurality of vouchers at the second application.

15. The method of claim 14, wherein respective vouchers of the plurality of vouchers authorize independent predefined operations to be performed in response to respective commands from the second application.

16. The method of claim 14, wherein respective vouchers of the plurality of vouchers authorize respective predefined operations to be performed in a specified order in response to respective commands from the second application.

17. The method of claim 1, further comprising:
detecting a second user input in the user interface for the second application, the second user input corresponding to the predefined second operation; and in response to detecting the second user input, sending the voucher from the second application to the first application, wherein the voucher includes a command corresponding to an operation at the server system; and in response to receiving the voucher at the first application:
sending the voucher from the first application to the server system.

18. The method of claim 17, further comprising:
in response to receiving the voucher at the first application:
- prompting the user to select a choice in a user interface for the first application; and
- detecting a third user input in the user interface for the first application, the third user input corresponding to selection of the choice in the user interface for the first application; and
in response to detecting the third user input:
- performing a third operation at the electronic device, the third operation changing a setting for the first application.

19. An electronic device, comprising:
one or more processors; and
memory storing one or more programs, including a first application associated with a server system and a second application not associated with the server system, wherein the one or more programs are stored in the memory and configured to be executed by the one or more processors, the one or more programs comprising instructions for:
detecting a first user input in a user interface for the second application;

in response to detecting the first user input, sending a first request from the second application to the first application; and in response to the first request:
- sending a first command from the first application to the server system on behalf of the second application, for performance of a first operation at the server system, the first operation corresponding to the first user input; and
- receiving a voucher at the second application pre-authorizing performance of a predefined second operation at the server system upon receipt, by the server system, of a second command from the second application.

20. A non-transitory computer-readable storage medium storing one or more programs, including a first application associated with a server system, the one or more programs comprising instructions, which when executed by a client device with a display, cause the device to:

in response to a first request received at the first application from a second application, the second application not being associated with the server system, the first request resulting from a first user input provided to the second application:
- send a first command from the first application to the server system on behalf of the second application, for performance of a first operation at the server system, the first operation corresponding to the first user input; and
- provide a voucher to the second application pre-authorizing performance of a predefined second operation at the server system upon receipt, by the server system, of a second command from the second application.

* * * * *